United States Patent
Ng et al.

(10) Patent No.: US 7,533,142 B2
(45) Date of Patent: May 12, 2009

(54) METHOD FOR ENABLING ASSOCIATED PORTLETS OF A WEB PORTLET TO COLLABORATE FOR SYNCHRONIZED CONTENT DISPLAY

(75) Inventors: Joanna Ng, Unionville (CA); Rohit Kapoor, Richmond Hill (CA); Leho Nigul, Toronto (CA)

(73) Assignee: International Business Machines Corporation, Armonk, NY (US)

(*) Notice: Subject to any disclaimer, the term of this patent is extended or adjusted under 35 U.S.C. 154(b) by 579 days.

(21) Appl. No.: 10/527,146

(22) PCT Filed: Oct. 1, 2003

(86) PCT No.: PCT/GB03/04238

§ 371 (c)(1),
(2), (4) Date: Mar. 8, 2005

(87) PCT Pub. No.: WO2004/031985

PCT Pub. Date: Apr. 15, 2004

(65) Prior Publication Data

US 2006/0031377 A1    Feb. 9, 2006

(30) Foreign Application Priority Data

Oct. 4, 2002   (CA) .................................. 2406569

(51) Int. Cl.
G06F 15/16 (2006.01)
(52) U.S. Cl. ................... 709/202; 709/203; 709/217
(58) Field of Classification Search ......... 709/201–203, 709/218, 222, 223; 715/751, 764; 719/312
See application file for complete search history.

(56) References Cited

U.S. PATENT DOCUMENTS

| 2,233,620 | A | 3/1941 | Lippincott et al. |
| 5,634,127 | A | 5/1997 | Cloud et al. |
| 5,884,316 | A | 3/1999 | Bernstein et al. |
| 5,915,087 | A | 6/1999 | Hammond et al. |
| 5,941,954 | A | 8/1999 | Kalajan |
| 5,941,988 | A | 8/1999 | Bhagwat et al. |
| 6,006,266 | A | 12/1999 | Murphy, Jr. et al. |
| 6,041,357 | A | 3/2000 | Kunzelman et al. |
| 6,061,741 | A | 5/2000 | Murphy, Jr. et al. |
| 6,125,366 | A | 9/2000 | Bernstein et al. |

(Continued)

FOREIGN PATENT DOCUMENTS

JP         200128604  A1    1/2001

(Continued)

OTHER PUBLICATIONS

Stephan Hesmer, Peter Fischer and Ted Buckner: "Portlet Development Guide"—Introduction to the Portlet API. Jan. 30, 2002. Edition 1.1. pp. 1-59.*

(Continued)

*Primary Examiner*—Kevin Bates
(74) *Attorney, Agent, or Firm*—Kunzler & McKenzie

(57) ABSTRACT

The invention provides a method for collaboration between a plurality of associated portlets in a portal server comprising: associating each portlet with a portlet descriptor describing context names; forming collaboration groups of portlets having corresponding context names for sychronized contents.

7 Claims, 21 Drawing Sheets

U.S. PATENT DOCUMENTS

| | | | |
|---|---|---|---|
| 6,170,012 B1 | 1/2001 | Coss et al. | |
| 6,219,706 B1 | 4/2001 | Fan et al. | |
| 6,286,060 B1 | 9/2001 | DiGiorgio et al. | |
| 6,301,011 B1 | 10/2001 | Fung et al. | |
| 6,304,893 B1 | 10/2001 | Gish | |
| 6,327,628 B1 * | 12/2001 | Anuff et al. | 719/311 |
| 6,345,291 B2 | 2/2002 | Murphy, Jr. et al. | |
| 6,351,772 B1 | 2/2002 | Murphy, Jr. et al. | |
| 6,356,905 B1 | 3/2002 | Gershman et al. | |
| 6,401,085 B1 | 6/2002 | Gershman et al. | |
| 6,412,073 B1 | 6/2002 | Rangan | |
| 6,424,979 B1 | 7/2002 | Livingston et al. | |
| 6,735,586 B2 * | 5/2004 | Timmons | 707/3 |
| 6,871,197 B1 * | 3/2005 | Johnson | 706/61 |
| 6,922,695 B2 * | 7/2005 | Skufca et al. | 707/10 |
| 6,985,939 B2 * | 1/2006 | Fletcher et al. | 709/223 |
| 7,062,511 B1 * | 6/2006 | Poulsen | 707/104.1 |
| 7,103,844 B2 * | 9/2006 | Jones et al. | 715/742 |
| 7,240,280 B2 * | 7/2007 | Jolley et al. | 715/234 |
| 7,269,664 B2 * | 9/2007 | Hütsch et al. | 709/246 |
| 7,275,086 B1 * | 9/2007 | Bodnar | 709/218 |
| 7,376,739 B2 * | 5/2008 | Ramaswamy et al. | 709/226 |
| 2002/0138556 A1 * | 9/2002 | Smithline et al. | 709/203 |
| 2002/0169852 A1 * | 11/2002 | Schaeck | 709/218 |
| 2003/0014442 A1 * | 1/2003 | Shiigi et al. | 707/513 |
| 2003/0110448 A1 * | 6/2003 | Haut et al. | 715/513 |
| 2003/0126558 A1 * | 7/2003 | Griffin | 715/513 |
| 2003/0187956 A1 * | 10/2003 | Belt et al. | 709/219 |
| 2004/0133660 A1 * | 7/2004 | Junghuber et al. | 709/219 |
| 2004/0193699 A1 * | 9/2004 | Heymann et al. | 709/218 |
| 2005/0262075 A1 * | 11/2005 | Beartusk et al. | 707/8 |
| 2006/0069714 A1 * | 3/2006 | Blount et al. | 709/203 |

FOREIGN PATENT DOCUMENTS

| | | |
|---|---|---|
| WO | WO 01/33392 A2 | 5/2001 |

OTHER PUBLICATIONS

"Guidelines for Developing Portlets", http://www-3.ibm.com/software/webservers...ibrary/enable/InfoCenter/wps/wpspar.html, Jul. 26, 2002.

"Oracle Portal Development Kit: Guidelines for Parameter Passing in Portlets", http://arp.anu.edu.au/~kahlil/pdk/articles/guidelines.parameter.passing.html, Jul. 26, 2002.

"Interface Portlet Render Request", http://otn.oracle.com/products/iportal/f...al/provider/v1/PortletRenderRequest.html, Jul. 26, 2002.

"Oracle Portal Development Kit: Database Provider Sample Examples", http://otn.oracle/products/iportal/f...kdec/plsql/sample/installing.sample.html, Jul. 26, 2002.

"Oracle Portal Development Kit: Understanding the PageRenderer", http://otn.oracle.com/products/iportal/li.../aritcles/understanding.pagerenderer.html, Jul. 24, 2002.

"Oracle Portal Development Kit: Understanding the Parameter Passing JSP Sample", http://arp.anu.edu.au~kahlil.pdk/articles/understanding.parameter.passing.html, Jul. 24, 2002.

Syunichi Miyahara et al., "A Portal System Building Guide as Real Solution Part 2, Practical Portal System Building, Using Oracle 9iAS Portal and Clever Path Portal", DB Magazine, vol. 12m No. 4, p. 89-100, Shoeisya C. Ltd., Jul. 11, 2002 (CSDB: Local Technical Magazine 200302114006).

Hideaki Kijima, et al., "Elucidation! New Architecture of WebSphere Portal V4.1", Notes/Domino Magazine, Vo. 69, pp. 102-106, Softbank Publishing Co. Ltd., Jul. 1, 2002 (CSDB: Local Technical Magazine 200302134009).

Hunter, Java Servlet Programming, Oct. 1998.

Abdelnur et al., Jsr168 Portlet Specification, Aug. 5, 2002, http://web.archive.org/web/20020805125514/www.jcp.org/jsr/detail/168.prt.

Nakata Hideki, et al, "Grid portal Building tool kit Ninf-Portal", Parallel Processing Symposium, JSPP2002, vol. 2002 No. 8, p. 209-216, Information Processing Society of Japan Corp., May 29, 2002.

Hesmer et al.: "Portlet Development Guide , Introduction to the Portlet API", Jan. 30, 2002, pp. 1-59.

* cited by examiner

DYNAMIC CONTEXT CHAINING MODEL

Web Application Integration With Portal

Integration Structural Diagram

Integration Flow Diagram

Structure Diagram for Portal Integration with backend Web Application

Flow Chart for Integration

Example Of Dynamic Context Groups for Portlets

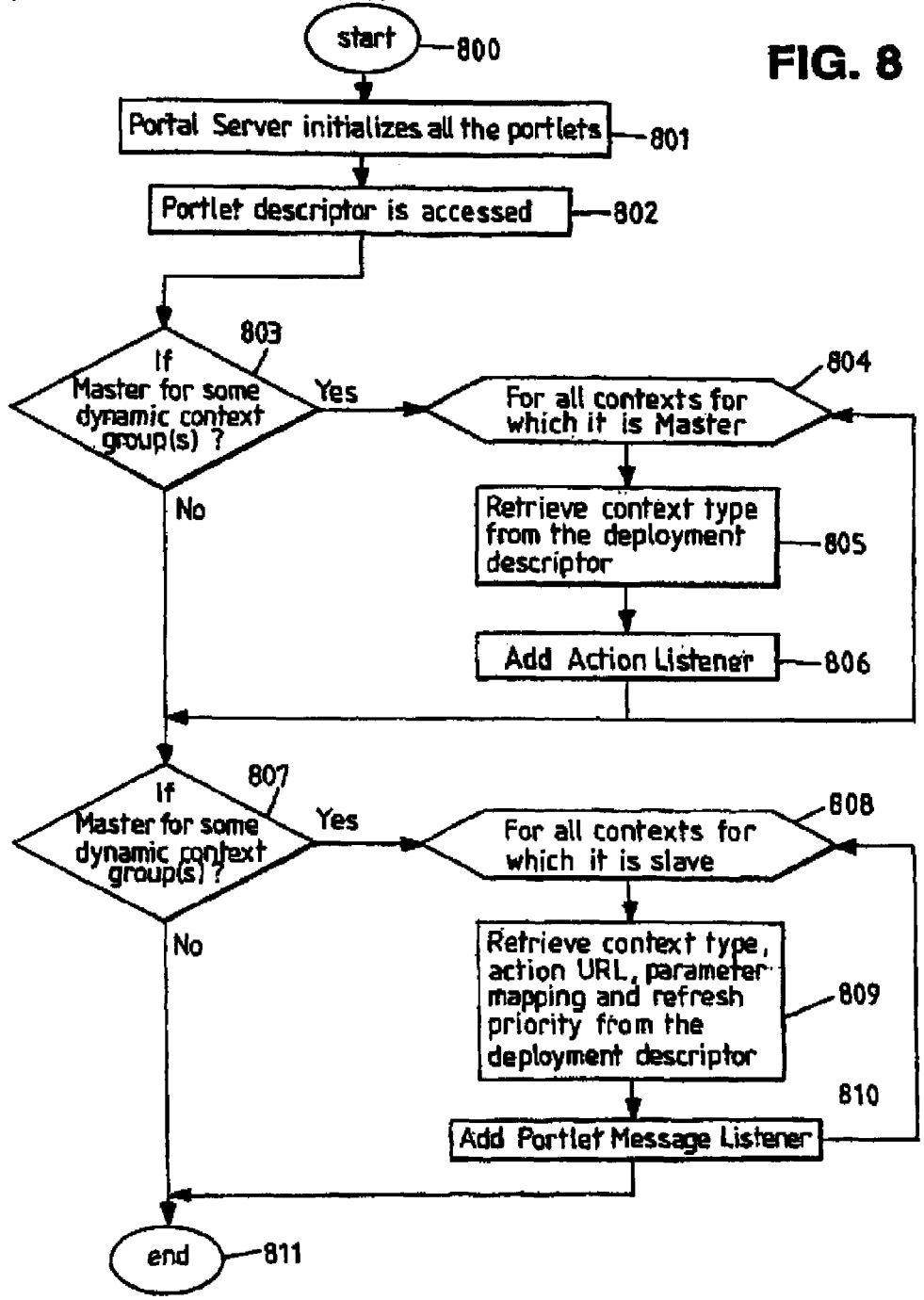

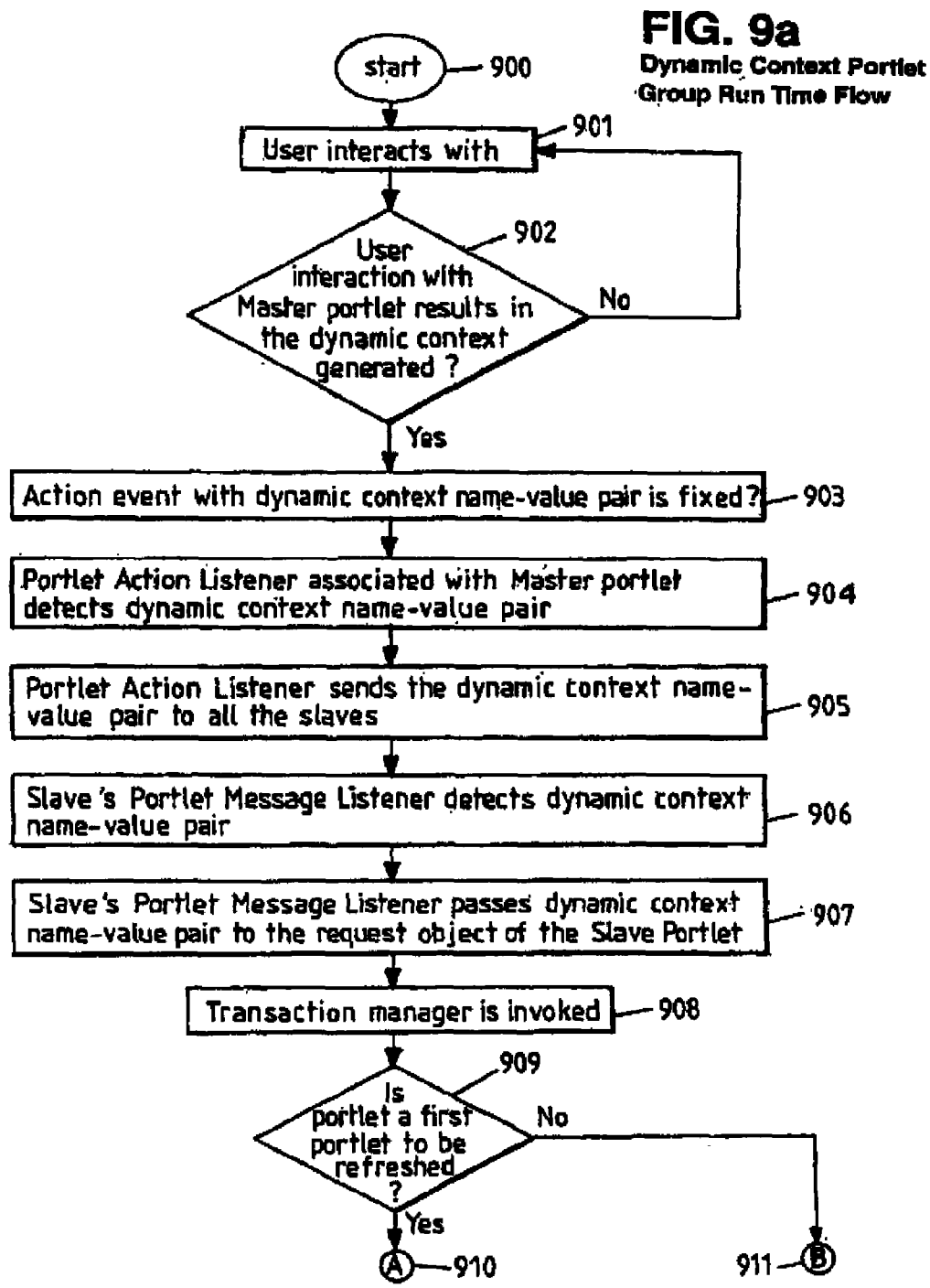

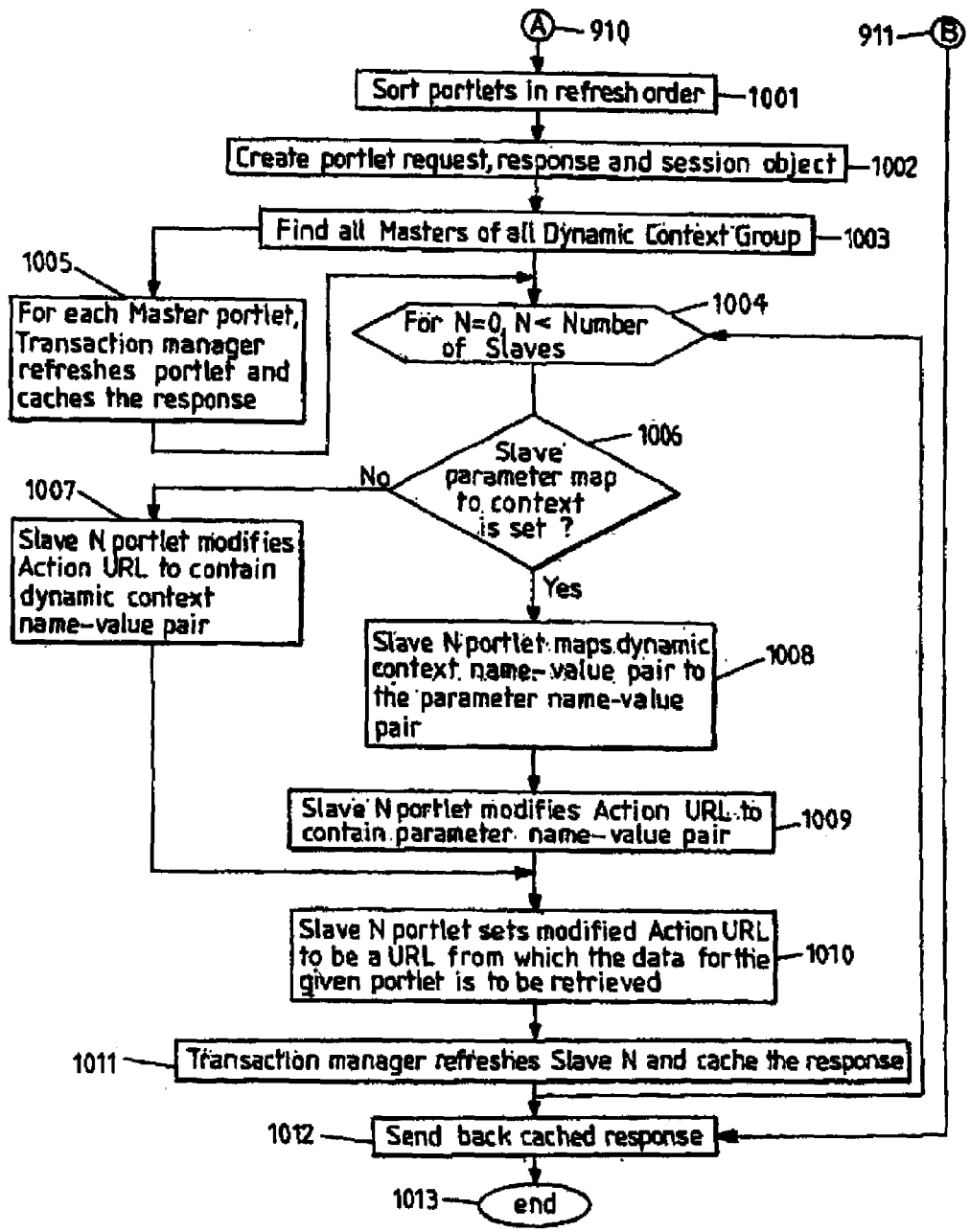

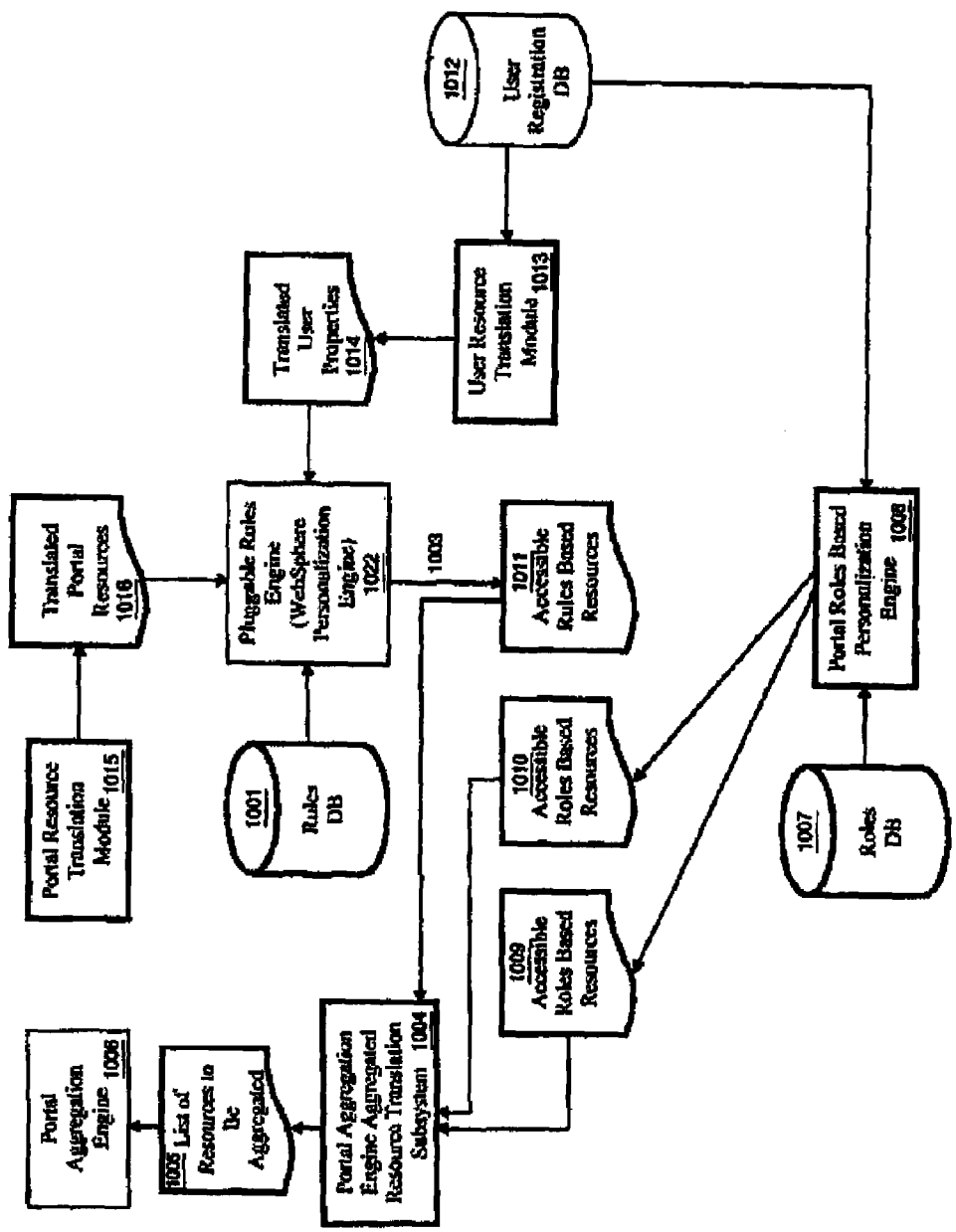

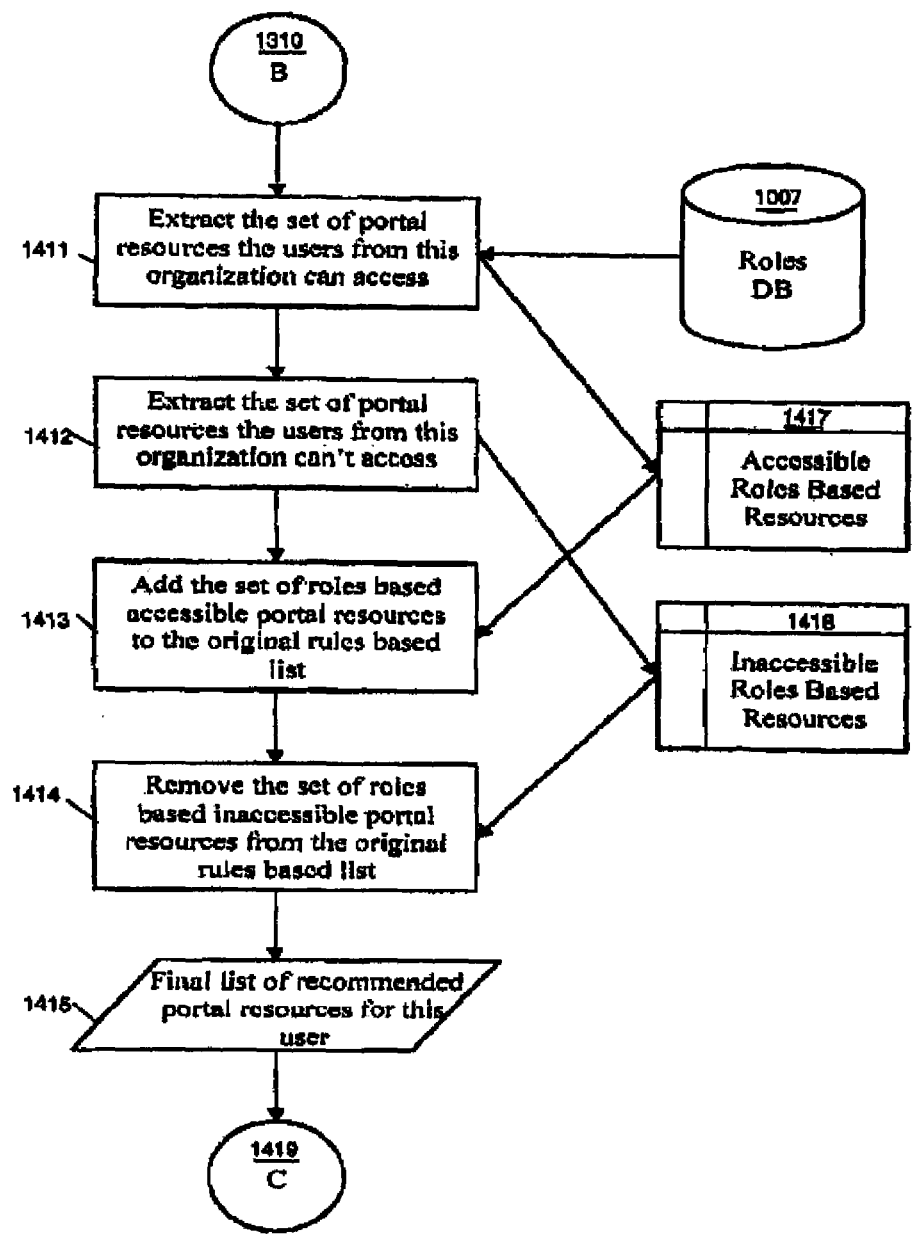

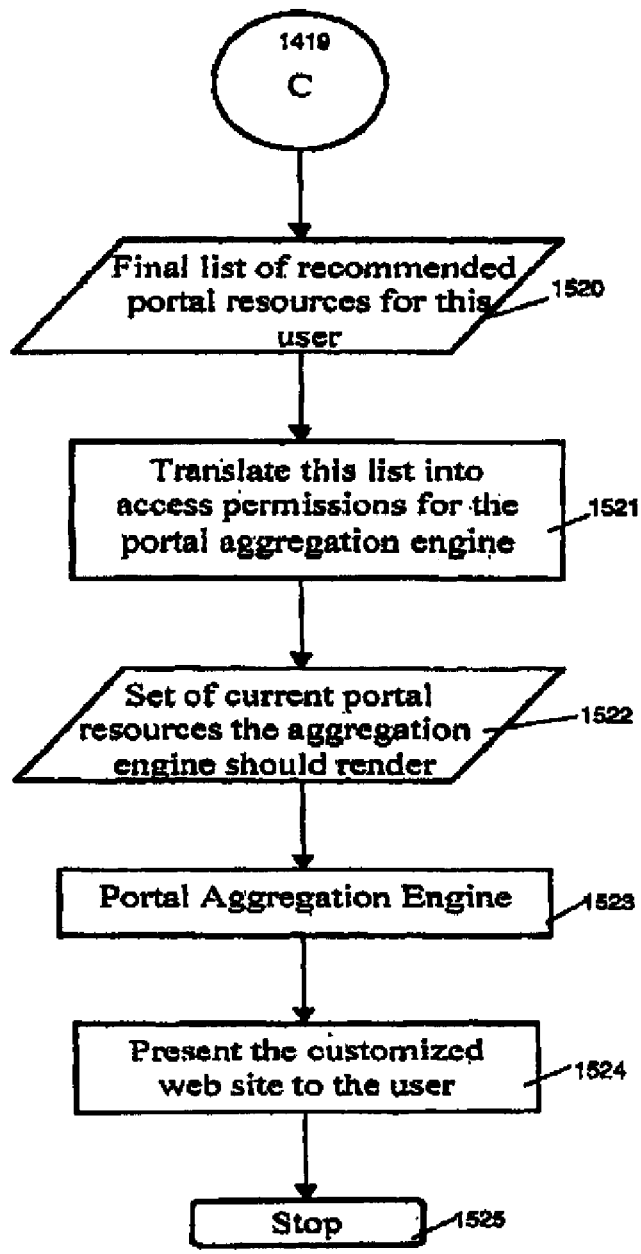

Sync model diagram

METHOD FOR ENABLING ASSOCIATED PORTLETS OF A WEB PORTLET TO COLLABORATE FOR SYNCHRONIZED CONTENT DISPLAY

FIELD OF THE INVENTION

This invention relates to the Internet, more particularly to methods for producing and using portals and portlets in web applications to provide enhanced capabilities for web sites.

BACKGROUND OF THE INVENTION

The World Wide Web brought a major paradigm shift to communications over the Internet, conveying graphical information to users. With the advent of the Web there was and still is demand for increasing communicability and broad connectivity.

The Portal (previously known as a web portal) has brought a paradigm shift in internet space. A web site that offers an array of resources or services such as email, forums, search engines, databases or other information may be considered to be a portal. The first web portals may have been online services. For the first time, users surfing the internet were able to see web pages that were assembled with and offered information coming from various sites in the world wide web, yet the aggregation's constitution was transparent to the user. A user making use of a typical web browser sees a cohesive web page displayed. The origination of different parts of the page from various internet sites not associated with the web site being viewed is not readily apparent. These parts are termed Portlets.

Portlets are the visible active components end users see within their portal pages. Similar to a window in a PC desktop, each portlet "owns" a portion of the browser or Personal Digital Appliance screen where it displays results.

From a user's view, a portlet is a content channel or application to which a user subscribes, adds to their personal portal page, and configures to show personalized content.

From content providers' view, a portlet is a means to make available their content.

From a portal administrator's view, a portlet is a content container that can be registered with the portal, so that users may subscribe to it.

From a portal's point of view, a portlet is a component rendered into one of its pages.

From a technical point of view, a portlet is a piece of code or a small application that runs on a portal server and provides content that is to be embedded into portal pages. In the simplest terms, a portlet may be a Java™ servlet that operates inside a portal.

Each part (portlet) of a given page (typically sourced from different places in the world wide web) can collaborate with another part (portlet) of the same page to achieve higher function for a user surfing or accessing the page. Thus, a portal becomes the single point of access for multiple users, via multiple channels, to multiple sources of information.

Portals can be applied in various business models, namely: business to consumer, business to business, or business to enterprise. The key to quick adoption of the portal paradigm ties strongly to its ability to integrate existing web application data into the portal framework in a seamless fashion.

However, various technical hurdles still exist for such seamless web application integration into portal.

There are limitations in the prior art concerning how the following portal artifacts work together with existing web applications. The implementation of integration of web applications into portal architecture is not well defined. These entities include:
  Original http request to a portal;
  A portlet session within a portal;
  A http request from the portal to the pertinent web application.

When different users access a portal page, the original http request for each user is directed towards the portal server (a). The original http session for each user is also entirely "owned" by the portal server. Each of the portlets has its own independent session called a portlet session. When a portlet needs to render information that comes from a given web application, (b), there are typically the following technical hurdles:
  i. There is no existing mechanism for a portlet to generate http requests and responses to and from the backend web application.
  j. There is no existing mechanism to manage multiple requests and responses to a calling portlet (and the portlet session) mapping correctly with multiple requests and responses to a backend web application (and the web application's session). Each (both portlet and web application) maintains its user session accordingly.

This gets complicated when multiple portlets call the same web application, with the web application treating these multiple portlets requests within the same web application session.
  k. There is no existing mechanism to relay session information between the multiple portlet sessions and the web application's session.

When a well defined set of portlets within the same portlet application interact with the one web application at the backend, all the participating portlets must be able to retrieve and forward the correct session information to the web application at the backend such that the information rendered from the web application is consistent with the setting of that of the portal of the portlets. Examples of such setting includes locale information, user agent of that particular access etc. For example, the responses sent from the web application must be using the same locale with the portlet in the portal server who displays it.

There is no existing mechanism for single sign on such that the portal user's credentials will not be challenged by the backend web application. This is a critical requirement. The absence of it will result in the user's credentials being challenged when the user moves from one part of a web page to a different part of the same web page; as the portlets have different originations and identification requirements.

There is no existing mechanism for synchronization of multiple requests or responses between portlets of a given portlet application and the pertinent web application backend.

The prior art has limitations concerning how multiple portlets within the same portlet application can collaborate with one another (sharing the same context) as well as with the various integrated web applications dynamically is not defined.

One Usage Scenario involving multiple portlets collaborating by sharing the same 'context' dynamically will serve to conceptually illustrate the limitation:

With three portlets being displayed on the same portal web page:
  one portlet shows the account summary by displaying a list of accounts
  the second portlet shows a given account's list of outstanding invoices the third portlet shows a given account's order history summary The second and the third portlets are contextually bound to the first portlet dynamically, reflecting outstanding invoices ($2^{nd}$ portlet) and order history ($3^{rd}$ portlet) and are synchronized with an account selected from the account list of the first portlet.

Limitations of the Prior Art:
i. No mechanism exists to define a sub-grouping of portlets within a portlet application that would work collaboratively.
j. No mechanism exists to define a context (that can be dynamically changed) shared among this sub-group of portlets within a given portlet application: example of context here is the selected account in portlet 1, such account selection can be changed dynamically.
k. No mechanism exists to detect the change in context dynamically: example of the change of selection from one account to another account from the account list in portlet 1 of the above example.
l. No mechanism exists to register a predefined action (or responses) for each participating portlets within the sub-group of portlets that share the same context: example of displaying the list of outstanding invoices (action in portlet 2) when the context is changed (from one account selection to another in portlet 1).
m. No mechanism exists to relay that dynamic context to the relevant integrated web applications There is no mechanism existing in the prior art to define a refresh sequence for a group of portlets within a portlet application
i. There is no provision today for a portal designer to specify the refresh order of a given set of portlets being displayed.
In our scenario above, the portal designer would want to have the first portlet (account list) refreshed first, the second portlet refreshed second etc. so that the $2^{nd}$ and the $3^{rd}$ portlets automatically have. Defined actions (when the portlet is deployed) taking place in a correct sequence.

There is a lack of a well defined mechanism in portal architecture to support the aggregation of portlets based on business rule and user profiling information including the users' role.
i. There is no existing mechanism to define aggregation of portal resources per user based on business rules.
Example: all teenage portal users see one group of portlets, all senior portal users see another group of portlets.
j. There is no existing mechanism for such rule based and user based aggregation of portlets that is performed dynamically at runtime.

There is no sharing of portal level business rules and user profile information with pertinent integrated back end web applications.

There is no sharing of business rules or user segmentation information with an integrated web application such that these rules and user segmentation can be consistent across a portal and its integrated backend web application. For example, if there is a rule defining the age range of a teenager, such a rule should be visible and applicable to the integrated web application for consistency.

Terminology

Portlets

Portlets are the visible active components that the end users see within their portal web pages. Similar to a window in a PC desktop, each portlet "owns" a portion of the browser or PDA (Personal Digital Appliance) screen where it displays portlet specific information.

Portlet Application

Portlets can also be grouped together in a portlet application. Portlet applications are distributed and deployed using Web archive files (WAR). There are portlet specific extensions to the standard Web application deployment descriptor.

Portlet Messages

Portlet messages are used for the communication between two portlets using portlet actions and portlet messages. The sending portlet creates a portlet action, encodes the action into a URL. When the URL is addressed, e.g. by a user trying to accomplish an task, the action listener is called and sends a portlet message to send the necessary data.

Portlet Session

A Portlet session is created for each portlet instance for each user logging on to maintain session information for each user per portlet instance.

Portlets of a given portlet application have limitations today concerning how multiple portlets within the same portlet application can collaborate with one another, sharing the same context, such these portlets that render responses from the integrated web application are able to render content dynamically related to the context in effect.

There is also no mechanism today to define subgroup of portlets within a given portlet application to work collaboratively in such a manner that no code change of the participating portlets is required. There is also no mechanism to detect the change in context dynamically nor is there mechanism today to register a predefined action for the participating portlets, including mechanism to relay that dynamic context to the relevant integrated web application.

SUMMARY OF THE INVENTION

The various embodiments and aspects of the invention herein address one or more shortcomings of the prior art.

A method according to the invention makes use of a dynamic context Portlet group that enables the collaboration among portlets within the same dynamic context portlet group to achieve business process and information integration and synchronization.

Another embodiment of the invention provides means for managing the multiple associated portlets; each associated portlet having a portlet descriptor describing context names, with defining context values. Each group of portlets includes a master portlet and at least one slave portlet; each group of portlets share context names in common.

Another embodiment of the invention includes means in the portal server for broadcasting communicating changes in context values of a master portlet to slave portlets. Each portlet descriptor includes refresh priority description of the portlet. The master portlets have higher priorities than slave portlets.

Embodiments of this invention make possible the synchronization of information integration and business process integration. Simple structure of dynamic context group enables the contextual grouping through deployment without requiring implementation change of the portlets, providing advantage of the invention.

One embodiment of the invention provides apparatus for displaying to a user a web portal for a web application, the web portal displaying a plurality of associated portlets, sharing information with each other, accessible by the user;

including: a portal server for operating a web portal to provide access to the web application; a portlet application for operating on the portal server, for managing a collection of associated portlets; the portlet application includes: means to initiate portlets on requests of a user to access the web application; means to manage a portlet application session object for the portlets; and, a portlet application session object data store controlled by the portlet application session object for saving parameters from user requests for associating the portlets with the with the portlet application session object.

The apparatus of the invention may include a portlet application communication client in the portlet application for communicating between the portlet application session object and the web application to convey user requests received from the associated portlets to the web application. The portlet application may assign a common key to each portlet associated with a portlet application session object.

Another embodiment of the invention provides an apparatus for displaying a web portal for a web application to a plurality of users, the web portal displaying a plurality of portlets, sharing information, accessible by the users; including: a portal server for operating a web portal to provide access to the web application; a portlet application for operating on the portal server for each of the plurality of users, for managing a collection of associated portlets for each of the plurality of users; each the portlet application includes: means to initiate portlets on requests of one of the plurality of users to access the web application; means to manage a portlet application session object for the portlets; and, a portlet application session object data store controlled by the portlet application session object for saving parameters from user requests for associating the portlets with the with the portlet application session object.

Another embodiment of the invention provides apparatus for displaying to a user a web portal for a plurality of web applications, the web portal displaying a plurality of associated portlets, sharing information with each other, accessible by the user; including: a portal server for operating a web portal to provide access to the web application; a plurality of portlet applications relating respectively to the plurality of web applications for operating on the portal server, each portlet application being adapted to managing a collection of associated portlets; each the portlet application includes: means to initiate portlets on requests of a user to access one of the plurality of web application; means to manage a portlet application session object for the portlets; and, a portlet application session object data store controlled by the portlet application session object for saving parameters from user requests for associating the portlets of the portlet application with the with the portlet application session object of the portlet application session.

Another aspect of the apparatus of the invention includes a user session information table adapted to connect to multiple web applications with the portlet application session object.

Still another embodiment of the invention provides apparatus for displaying to a user a web portal for a web application, the web portal displaying a plurality of associated portlets, sharing information with each other, accessible by the user; including: a portal server for operating a web portal to provide access to the web application; a portlet application for operating on the portal server, for managing a collection of associated portlets; the portlet application including: means to initiate a first portlet on request of a user to access the web application; means to create a portlet application session object for the user for the first portlet; means to save parameters from the request; means to generate additional portlets associated with the first portlet on further requests of the user to access the web application; a portlet application session object data store controlled by the portlet application session object for using the saved parameters for associating the additional portlets with the with the portlet application session object; and, means to create a portlet application communication client (httpClient) for communicating with the portlet application session object and the web application to convey user requests received from the first and additional portlets to the web application.

The apparatus may include a portlet application communication client in the portlet application for communicating between the portlet application session object and the web application to convey user requests received from the associated portlets to the web application.

The portlet application preferably assigns a common key to each portlet associated with a portlet application session object.

A user session information table adapted to connect to multiple web applications with the portlet application session object may advantageously be provided.

Another embodiment of the invention provides apparatus for displaying to a user a web portal for a web application, the web portal displaying a plurality of associated portlets, sharing information with each other, accessible by the user; including: a portal server operating a web portal to provide access to the web application; a portlet application operating on the portal server, for managing a collection of associated portlets; the portlet application including: means to initiate portlets on requests of a user to access the web application; means to manage a portlet application session object for the portlets; and, a portlet application session object data store controlled by the portlet application session object for saving parameters from user requests for associating the portlets with the with the portlet application session object.

Another aspect of the invention provides a method of sharing information between a plurality of associated portlets in a web portal including: granting access for each of the plurality of associated portlets to a portlet data store; permitting each of the plurality of associated portlets to write data to the portlet data store and to read stored data from the portlet data store.

The method above may advantageously provide a system wherein the associated portlets are managed by a portlet application adapted to operate on a data processing system; wherein the portlet data store comprises portlet application storage managed by a portlet application session object which controls reading and writing of data by the associated portlets in the data store permitting exchange of data among the associated portlets of the portlet application.

Another aspect of the invention provides apparatus for sharing information between multiple associated portlets in a web portal including: a portlet application for managing the multiple associated portlets; a portlet application data store; means for granting read/write access to the data store by the multiple associate portlets to enable the portlets to exchange data among each other.

Yet another aspect of the invention provides a portlet (application) server capable of operating on a portal server for hosting multiple associated portlets in a web portal including: means for managing the multiple associated portlets; means for managing a portlet application session object; a portlet application data store managed by the portlet application session object for granting read/write access to the data store to the multiple associate portlets to enable the associated portlets to exchange data among each other.

Another aspect of the invention provides a portlet (application) server capable of operating on a portal server for hosting multiple associated portlets in a web portal including:

means for managing the multiple associated portlets; means for creating and managing a portlet application session object; a portlet application data store created and managed by the portlet application session object for granting read/write access to the data store to the multiple associate portlets to enable the associated portlets to exchange data among each other.

Advantageously, the portlet application assigns a common key to each portlet associated with a portlet application session object.

Another aspect of the invention provides a portlet application capable of operating on a portal server for hosting multiple associated portlets in a web portal accessible by a user, including: portlet application means for managing the multiple associated portlets; portlet application means for managing a portlet application session object for the user; portlet application means for granting the key to each associated portlet for controlling access to the portlet application object.

Still another aspect of the invention provides a portlet application capable of operating on a portal server for hosting multiple associated portlets in a web portal accessible by a user, including: portlet application means for managing the multiple associated portlets; portlet application means for creating and managing a portlet application session object for the user; portlet application means for creating and managing a key for the user for the portlet application session object; portlet application means for granting the key to each associated portlet for controlling access to the portlet application object.

Advantageously one portlet application is assigned to each user and one key is assigned respectively for each user to respective portlet application objects for each portlet application.

Another aspect of the invention provides apparatus for displaying to a user a web portal for a web application including: a portal server for operating a web portal to provide access to the web application by a user; a portlet application, for managing a collection of associated portlets, for operating on the portal server; a portlet application session object for the user for the associated portlets; a portlet application session object data store controlled by the portlet application session object; a portlet application communication client linked to the portlet application data store for communicating between the associated portlets and the web application to convey user requests received from the associated portlets to the web application; the communication client having a request buffer for storing and synchronizing requests from the associated portlets to enable the communication client to generate synchronized to the web application.

Preferably the portlet application communication client is adapted to send information including requests over a network to a web application and receive information including responses to the requests from the web application.

Another aspect of the invention provides apparatus for displaying to a user a web portal for a web application including: a portal server for operating a web portal to provide access to the web application by a user; a portlet application, for managing a collection of associated portlets, for operating on the portal server; a portlet application session object for the user for the associated portlets; a portlet application session object data store controlled by the portlet application session object; a portlet application communication client linked to the portlet application data store for communicating between the associated portlets and the web application to convey user requests received from the associated portlets to the web application; the communication client having a request buffer for storing and serializing requests from the associated portlets to enable the communication client to generate serialized to the web application.

Preferably, the portlet application communication client is adapted to send information including requests over a network to a web application or web application server and receive information including responses to the requests from the web application.

Another aspect of the invention for a portal server adapted to operate a web portal to provide access to a web application; having a portlet application operating on the portal server, for managing a collection of associated portlets; wherein the portlet application includes: means to initiate portlets on requests of a user to access the web application; means to manage a portlet application session object for the portlets; and, a portlet application session object data store controlled by the portlet application session object for saving parameters from user requests for associating the portlets with the with the portlet application session object, the apparatus including: a portlet application communication client (httpClient) linked to the portlet application data store for communicating between the associated portlets and the web application to convey user requests received from the associated portlets to the web application; the portlet application communication client having a user session information store (mapping table) for storing user session information including selected information from the set of the following user session information: user id, user credentials, language preferences, session timeout information, session id, etc. for mapping the user session information to a corresponding session of the web application.

The session timeout information preferably includes session timeout information of the portal server and the web application.

Another aspect of the invention provides portlet application, for managing a collection of associated portlets in a portal, for operating on a server providing access to a web application by a user; the associated portlets having portlet request parameter maps storing data and instructions from user requests to the portlets; a portlet application session object for the user for the associated portlets; a portlet application session data store controlled by the portlet application session object; a portlet application communication client (httpClient) linked to the portlet application data store for communicating between the associated portlets and the web application to convey user requests received from the associated portlets to the web application; the communication client having a request buffer for storing requests from portlet request parameter maps of the associated portlets to enable the communication client to provide data and instructions for the web application.

Another aspect of the invention provides a portlet application communication client (httpClient) linked to the portlet application data store for communicating between the associated portlets and the web application to convey user requests received from the associated portlets to the web application; the portlet application communication client having a user session information store (mapping table) for storing user session information including selected information from the set of the following user session information: user id, user credentials, language preferences, session timeout information, session id, etc. for mapping the user session information to a corresponding session of the web application; the session timeout information including session timeout information of the portal server and the we application.

Preferably the above includes synchronization means for the portlet application communication client for matching session timeouts between portal server and the web application by re-authenticating the user if the web application times out before the portal server.

Another aspect of the invention provides a portlet application capable of operating on a portal server for hosting multiple associated portlets in a web portal accessible by a user, the portal server providing messaging means for allowing the associated portlets to message each other, including: portlet application means for managing the multiple associated portlets; each associated portlet having a portlet descriptor describing context names; the associated portlets including collaboration groups of portlets having corresponding context names defining context values; each the group of portlets including a master portlet and at least one slave portlet; wherein each the group of portlets share context names in common; means in the portal server for broadcasting communicating changes in context values of a master portlet to slave portlets of the master portlet; means in the portal server for changing context values of the slave portlets to match context values of the master portlet as broadcast.

Another aspect of the invention provides a portlet application capable of operating on a portal server for hosting multiple associated portlets in a web portal accessible by a user, the portal server having portlet refresh capability, including: portlet application means for managing the multiple associated portlets; each associated portlet having a portlet descriptor; each portlet descriptor including refresh priority description for the portlet; the associated portlets including collaboration groups of portlets; each the group of portlets including a master portlet and at least one slave portlet; means in the portlet application means for refreshing the portlets in order of their refresh priorities.

Still another aspect of the invention provides a portlet application capable of operating on a portal server for hosting multiple associated portlets in a web portal accessible by a user, the portal server having portlet refresh capability, including: the associated portlets including collaboration groups of portlets; portlet application means for managing the multiple associated portlets; each associated portlet having a portlet descriptor; each portlet descriptor including a refresh priority description for the portlet, and a refresh description priority for the group of portlets of which the portlet is a member; each the group of portlets including a master portlet and at least one slave portlet; means in the portlet application means for refreshing the portlets in order of their priorities; means in the portlet application means for refreshing the collaborative groups of portlets in order of their group refresh priorities.

The master portlets have higher priorities than slave portlets.

Preferably the portlet application refreshes the groups first in group priority order and then refreshes within each group in priority order.

Another aspect of the invention provides apparatus for displaying to a user a web page session for a web application, the web page session displaying a plurality of associated collaborative portlets, sharing information with each other, accessible by the user including: a portal server for operating a web portal to provide access to the web application; a portlet application, for managing a collection of associated portlets, for operating on the portal server; access means to access a rules database; the rules including rules controlling display of sets of portlets, pages, page groups to users; selection means to select a set of portlets, pages, and page groups to be displayed to a user based on information provided by the user (information properties).

In another variation of the invention the selection means includes a pluggable rules engine, a rules database, and a portlet application aggregation engine which applies rules to select and display selected portlets, pages, and page groups to a user.

Another aspect of the invention provides apparatus for displaying to a user a web page session for a web application, the web page session displaying a plurality of associated collaborative portlets, sharing information with each other, accessible by the user including: a portal server for operating a web portal to provide access to the web application; a portlet application, for managing a collection of associated portlets, for operating on the portal server; roles access means to access a roles database; the roles database containing rules controlling display of sets of portlets, pages, page groups to users based on user roles; role selection means to select a set of portlets, pages, and page groups to be displayed to a user based on an identified role of the user.

Other aspects of the invention provide an article including: a computer readable signal bearing medium; computer program code means recorded on the medium adapted to perform the methods of the embodiments of the invention described above.

Other aspects of the invention provide an article including: a computer readable signal bearing medium; computer program code means recorded on the medium adapted to implement the apparatus of any of the embodiments of the invention described above. The medium may be selected from the group consisting of magnetic, optical, biological, and atomic data storage media as appropriate.

The medium may be a modulated carrier signal.

The signal may be a transmission over a network.

BRIEF DESCRIPTION OF THE DRAWINGS

Embodiments of the present invention will be described, by way of example only, referring to the accompanying drawings in which:

FIG. 8 depicts a Portlet Application Initialization For Dynamic Context As Specified In the definition instance;

FIG. 9 depicts a Dynamic Context Portlet Group Run Time Flow;

FIG. 10 depicts a Role Based Dynamic Aggregation Component Structure Map;

DETAILED DESCRIPTION OF PREFERRED EMBODIMENTS OF THE INVENTION

A.1. Portal and Web Applications Integration Enablement

Figure 2:
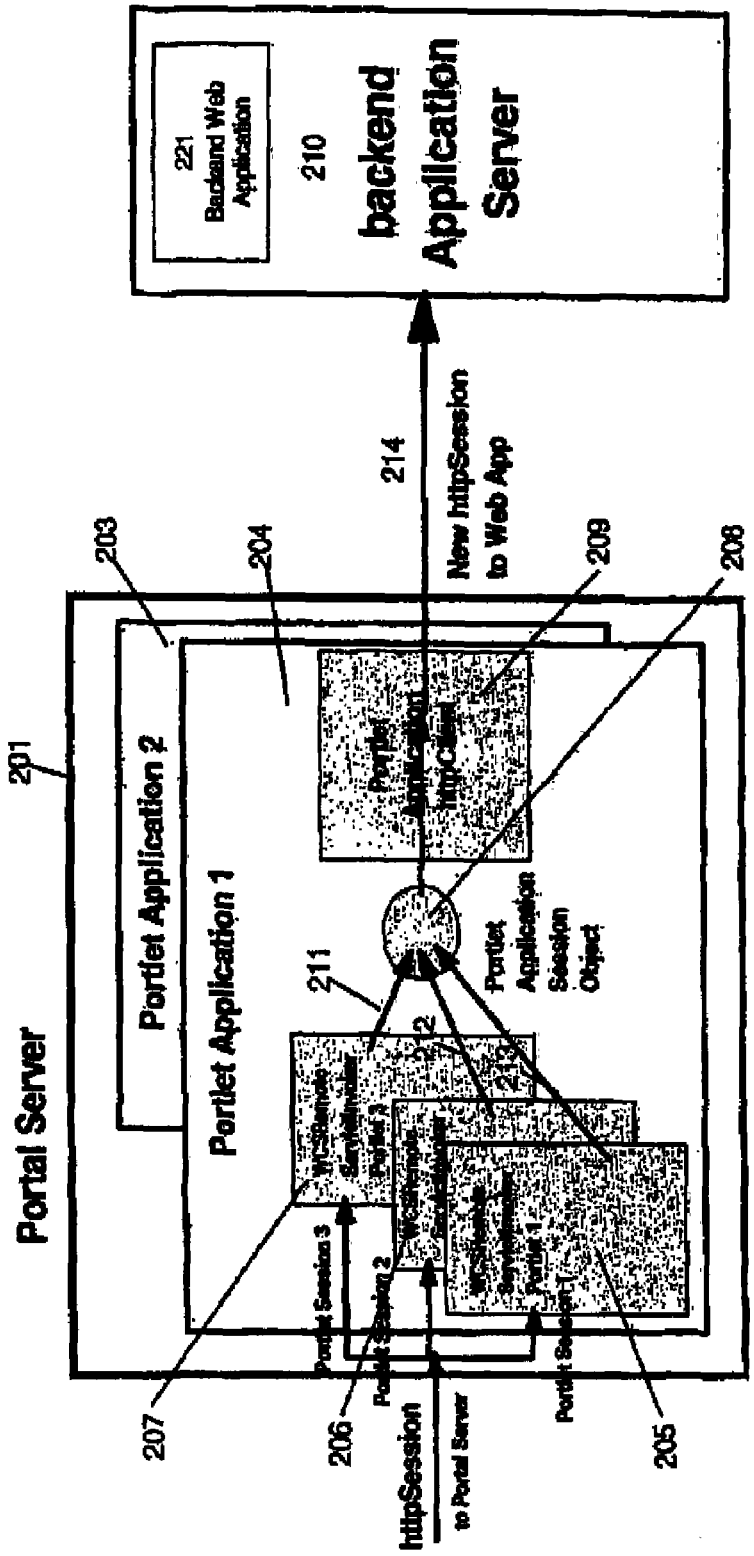
FIG. 2 depicts a Web Application Integration With Portal.

FIG. 2 illustrates a preferred embodiment of the invention illustrating its use with a web portal server.

A.1.1 Portlet Application http Client

The portlet (that makes http requests to the back end web application) uses the Portlet Application Http client 209 used to open an Http connection to a backend web application that runs on a backend application server 210. The backend web application requires a Portlet Application Http client 209 to provide session support over multiple requests and responses, cookie handling and Single Sign on (SSO) logic. All the portlets in the same portlet application use the same portlet application Http client object 209 to connect to one or more backend web applications. There is one Portlet Application http client 209 per portlet application 204.

A.1.2 Portlet Application Session

The Portlet Application Session object 208 is a unified data store object that can be shared by all portlets in a given portlet application. This object exists per user and per portlet application. The Portlet Application Session object 208 provides infrastructure so that multiple portlets in a given portlet application will have independent user sessions (called portlet sessions 204 205,206) but share the same Portlet Application Session, and communicate with the web application on the backend application server 210 with a single web application session.

A.1.3 Portlet Application Session Context

Portlet Application Session Context provides information that is per user and per portlet application. This means that all portlets within the same portlet application (204, 203) can now have a way to share common information among them.

A.1.4 Session Relay Mechanism 320

The Session relay mechanism enables the passing of information from the original http session held by the portal server to the back end http session created by the portlet application's http client. This mechanism uses the following infrastructure:

Cookie Table 305 & Cookie Lookup Key

Cookie table 305, (a user session information table) is the main entity for mapping the portal server cookies to the backend web application session cookies. The mapping relationship between the cookie of the http requests to the portal server and the cookie of the portlet application http client to one given web application is one to one. However, A given portlet application http client can make http requests to different web applications with each web application maintaining independent sessions. With that regard, the mapping between the portal server session cookie and that of the backend web applications can be one to many (due to multiple backend web application servers).

Figure 13:
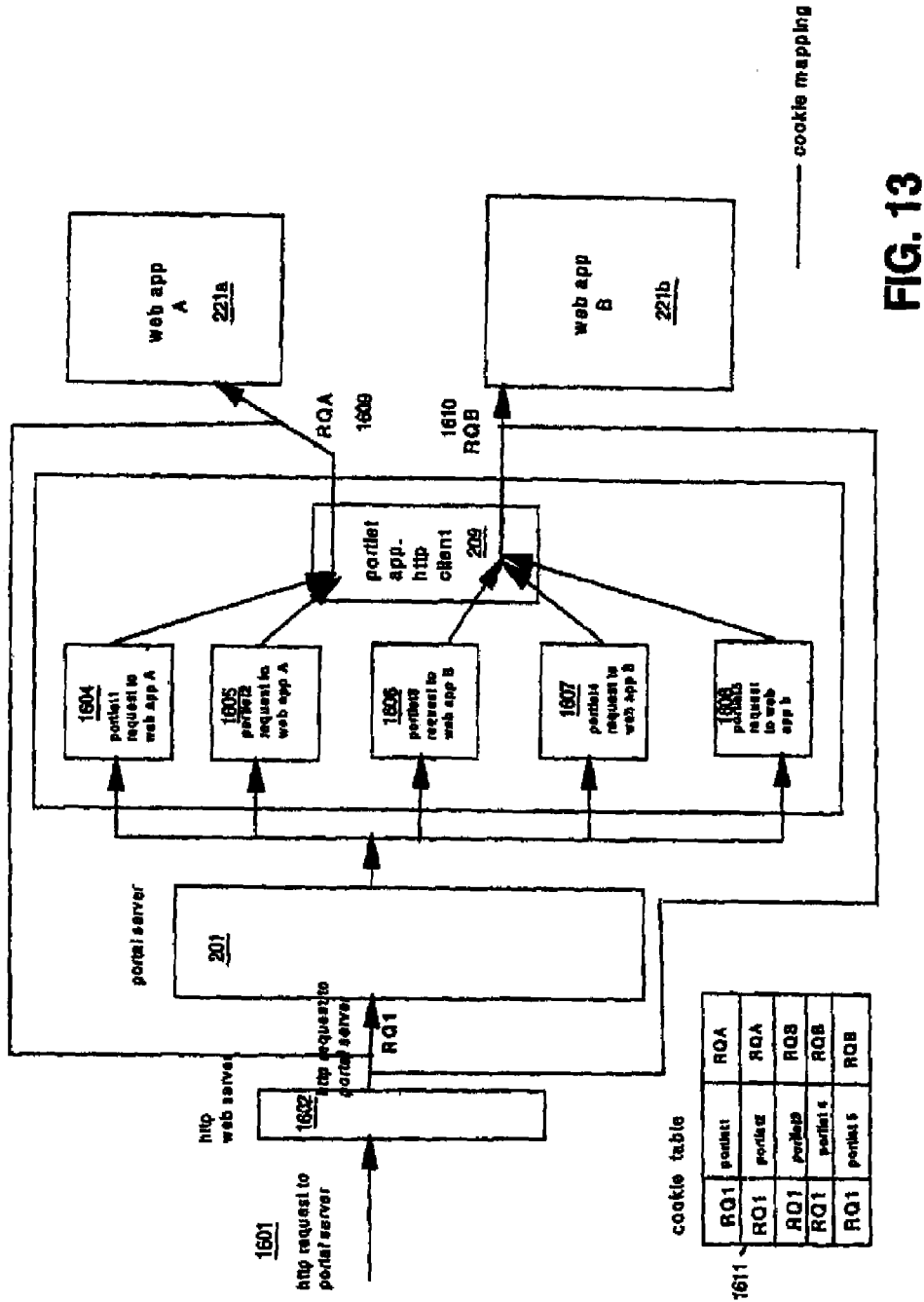
FIG. 13 depicts the handling of portlets requests to web applications.

FIG. 13 depicts this mapping, in which a number of items are illustrated:

RQ1: cookie from the http request of a user agent (browser) to the portal server RQA: cookie from the http request of the portlet http application client to the web application A RQB: cookie from the http request of the portlet http application client to the web application B The Portlet Application Http client 209 uses this table to look up the matching cookie to the backend web application running on the backend web application server 210.

The existence of this cookie mapping table 305 enables the automatic expiration of a backend web application session when the portal server session expires.

Cookie Lookup Key

The portlet application http client 209 is created per portlet application. The cookie lookup key is stored in the portal application session object which is accessible to all the portlets within the same portlet application. This cookie lookup key is responsible for matching the http session of the portal server with the http session of the back end application.

The use of the cookie lookup key allows all portlets in a given portlet application who share the same Http Client key to retrieve and forward the correct set of backend web application information for the currently logged in user such that all the portlets in the same portlet application work in synchronization to update the backend web application being used. The effect is that the end user sees a unified view of the backend web application through multiple portlets.

Portlet Request Parameter Map

The Portlet Request Parameter Map 308 is in a memory object stored in the shared application session data store which is created per portlet, per portal server session. It is used to store all request parameters from an incoming user request to a particular portlet.

A.2. Dynamic Content Synchronization of Portlets

A.2.1 Dynamic Context Definition Template

Figure 5:
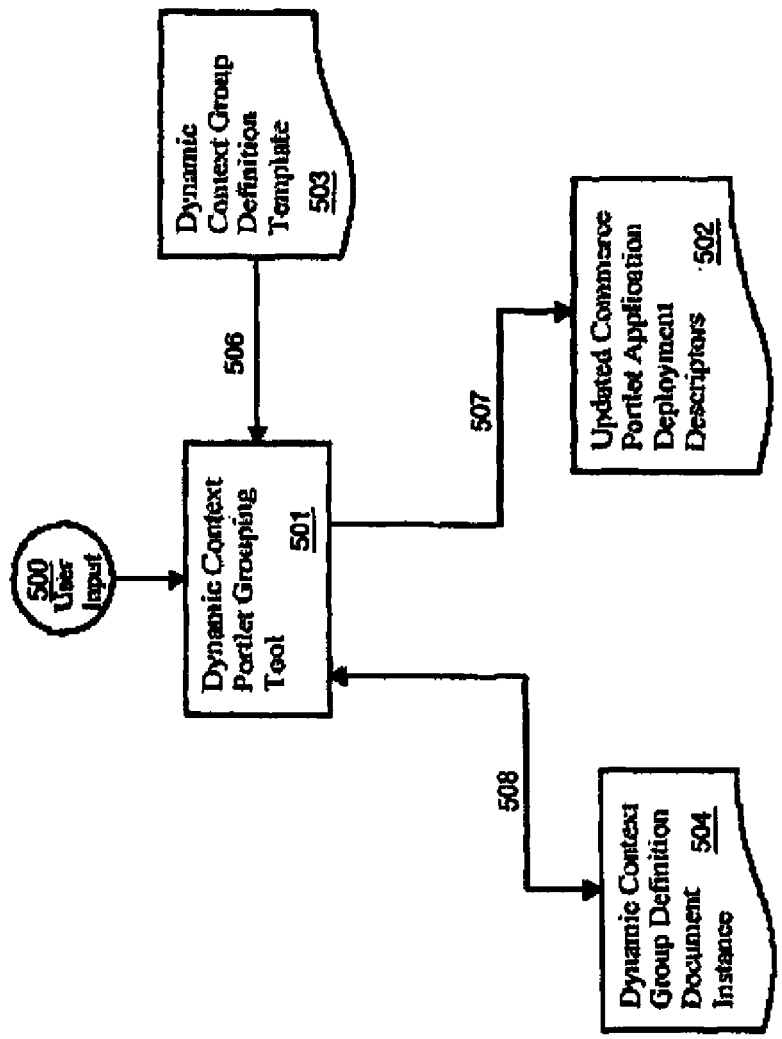
FIG. 5 depicts a Structure Diagram for Portal integration with Web Application.

FIG. 5 illustrates portal integration with a backend web application. Reference to FIG. 5 will be useful for the following:

The Dynamic context Definition template 503 defines the following for each Dynamic Context Group:

- the context and its type (in our previous example, it is the Account ID)
  - the master portlet who can change the value of the context defined
  - the slave portlet(s) who get notified when the defined context is changed
  - the slave portlet(s) registered response (or action) upon notification of the context change
  - optionally defines the refresh sequence of the slave portlets (master always get refreshed first within a given group)

One Dynamic Context Definition Template 503 can contain one or many Dynamic Context Group(s). But each Dynamic Context Group can only have

- one master portlet
- one defined context
- one or more than one slave portlets
- Notes: a given portlet can participate in more than one Dynamic Context Groups with different roles in each group.

A.2.2 Dynamic Context Portlets Grouping Generation Tool

This tool 501 reads in the Dynamic Context Definition Template 503 and generates Dynamic Context Master Portlet and Slave Portlets for all Dynamic Context groups according to the definition specified by updating the portlet deployment descriptors 502 correspondingly.

A.2.3 Dynamic Context Group

A dynamic context group is a subset of portlets that share the same context and are grouped under one dynamic context group. A given portlet can belong to more than one dynamic context group.

The Dynamic context group definition document instance 504 is used to define the dynamic context of a particular dynamic context group).

Dynamic Context Master Portlet
  Dynamic Context Master Portlet is responsible for
    detecting the context state change
    notifying all slave portlets on the context state change Dynamic Context Slave Portlet(s)
  Dynamic Context Slave portlets do the following:
    pulling for context change as notified by the master portlet
    performs the registered action directed towards the corresponding back end application upon notification of context change Dynamic Context Models
  There are two types of Dynamic Context models that can be used for associating portlets with each other:

A.2.4 The Sync Model

Figure 14:
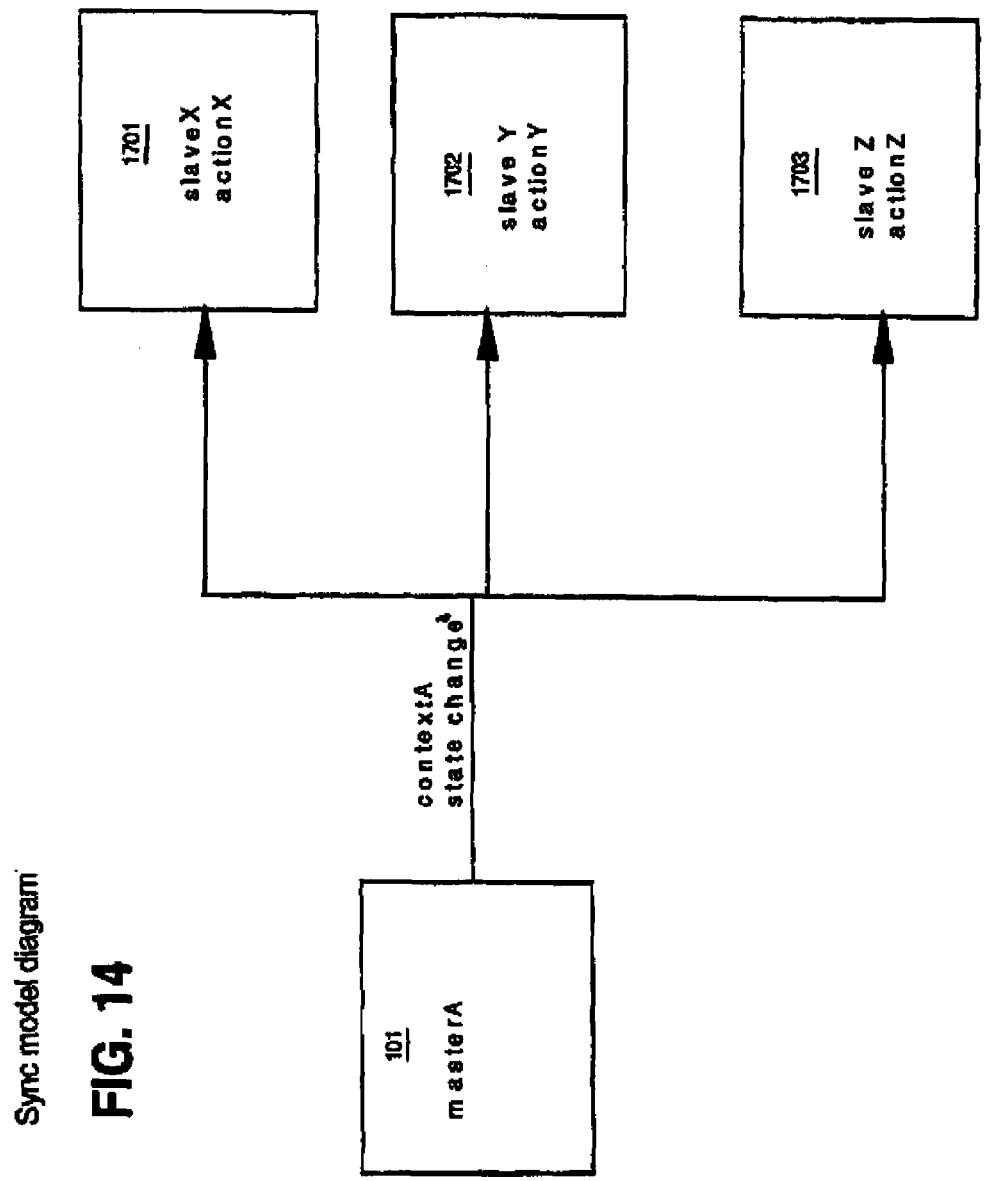
FIG. 14 depicts a sync model diagram.

In the Sync model, depicted in FIG. 14, the master portlet 101 informs the slaves 1701-1703 about the state change of the context of the Dynamic context master portlet. All slaves will perform actions based on a previously defined response to sync up with the master's context state change.

Sync Model Diagram

A.2.5 The Chaining Model

Figure 1:
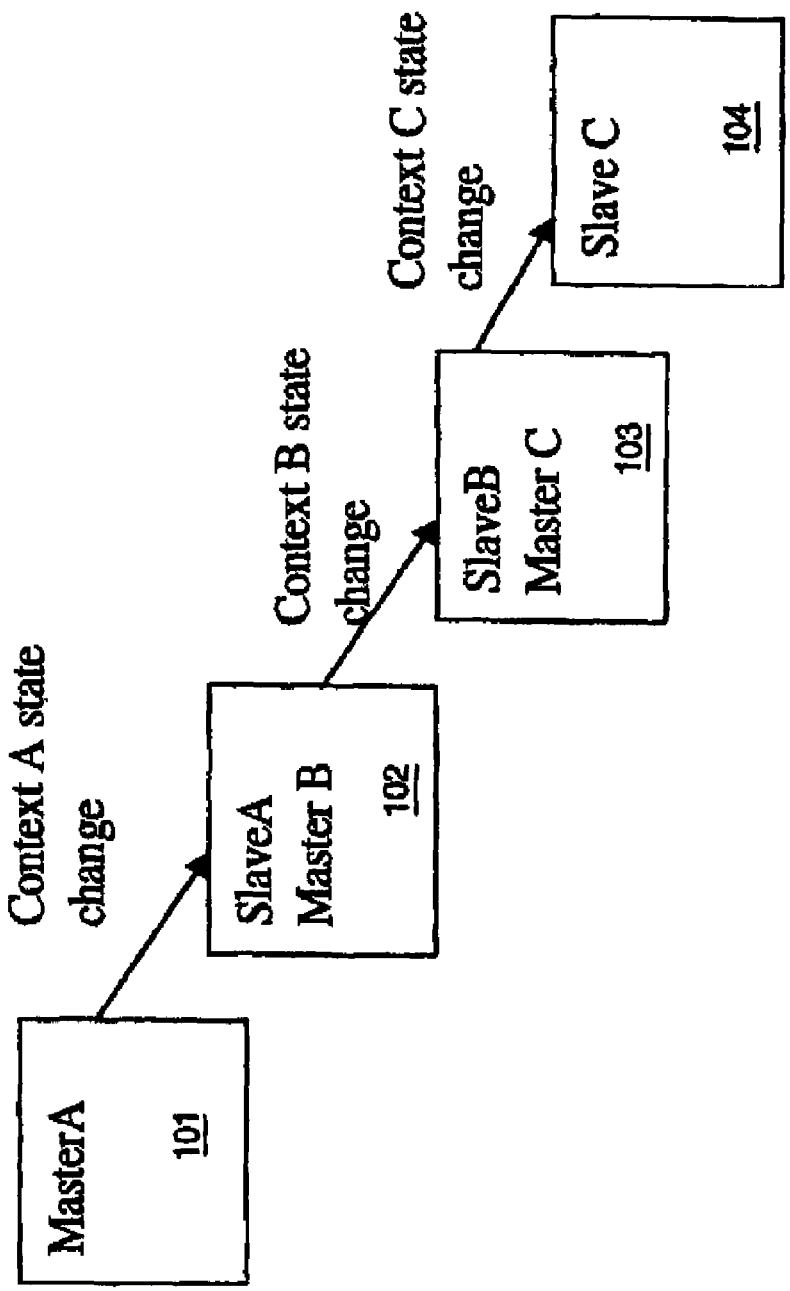
FIG. 1 depicts a Dynamic Context Chaining Model.

In the chaining model, indicated in FIG. 1, the change of state in Master A 101 results in the response action of Slave A 102, Slave A is also the Master portlet B, which leads to the change of state in context B, resulting in the context change response of Slave B 103, slave B is also the master portlet of dynamic context group C, resulting in the action response of Slave C.

Figure 15:
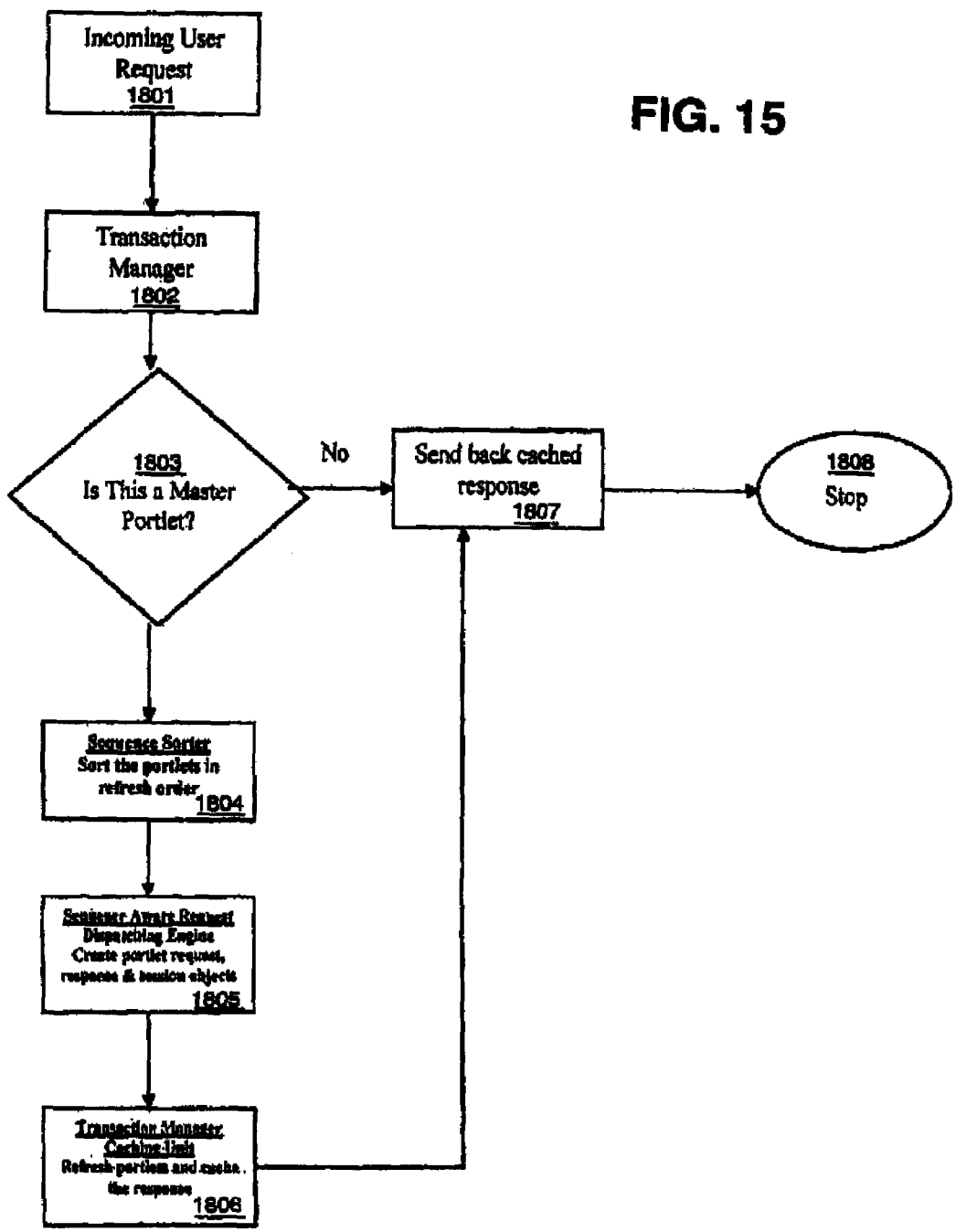
FIG. 15 depicts a flow chart for a sequence aware portal aggregation engine.

A.2.6 Portlet Transaction Manager:

A Sequence Aware Portal Aggregation Engine Extension Referring to FIG. 15, the portlet transaction manager 1802 is the component responsible for managing the runtime refresh sequencing of the portlets including the creation of portlet requests, responses, and sessions.

1. The first portlet to be refreshed for any portlet application is defined as that portlet which is refreshed first among all the portlets for a given user. There is no existing mechanism to define the refreshing sequence of portlets within a given page.

Thus, some logic is needed which can identify the master portlet dynamically at runtime. In the present embodiment a simple scratchboard is used where each portlet makes a mark every time it is refreshed. the first time a portlet makes a mark on this scratchboard it knows that it is the first or master portlet. The next portlet that makes a mark on this list can already see that other portlet has made a mark on it and knows that it is not the master portlet, etc. The next time the portal page is refreshed, the first portlet that makes a double mark on this list becomes the master portlet. The master portlet then, reinitializes this list by removing the marks of all the other portlets and also one of its double marks for the next request. This algorithm allows us to detect the master portlet dynamically every time a request comes in from the portlets' portal server.

After the first portlet is refreshed the transaction manager takes over to refresh the other portlets in the sequence as predefined in the master and slave portlet mapping of the dynamic context group.

2. Sequence sorter: The sequence sorter module 1804 is used to sort the portlets in their refresh sequence order. It used the portlet deployment descriptor to identify the refresh order of each portlet and then sorts them out for the request dispatching engine.

3. Sequence Aware Request Dispatching Engine Extension: This engine 1805 is used to dispatch requests to the portlets and over-rides the portal aggregation engine. Its job is to construct the appropriate portlet request and response objects, as well as the portlet session for all the portlets in the commerce portal application. It is then used by the transaction manager to actually refresh the portlets.

4. Transaction Manager Caching Unit: The transaction manager caching unit 1806 is used by the transaction manager 1802 to cache the responses produced by the portlets as they are refreshed by the request dispatching engine. This is necessary as when the portal aggregation engine now requests for a portlet refresh, these cached responses are sent back to it by the transaction manager. This avoids the problem of double refresh per incoming portal request.

A.3. Rule Based and Role Based Aggregation

Figure 11:
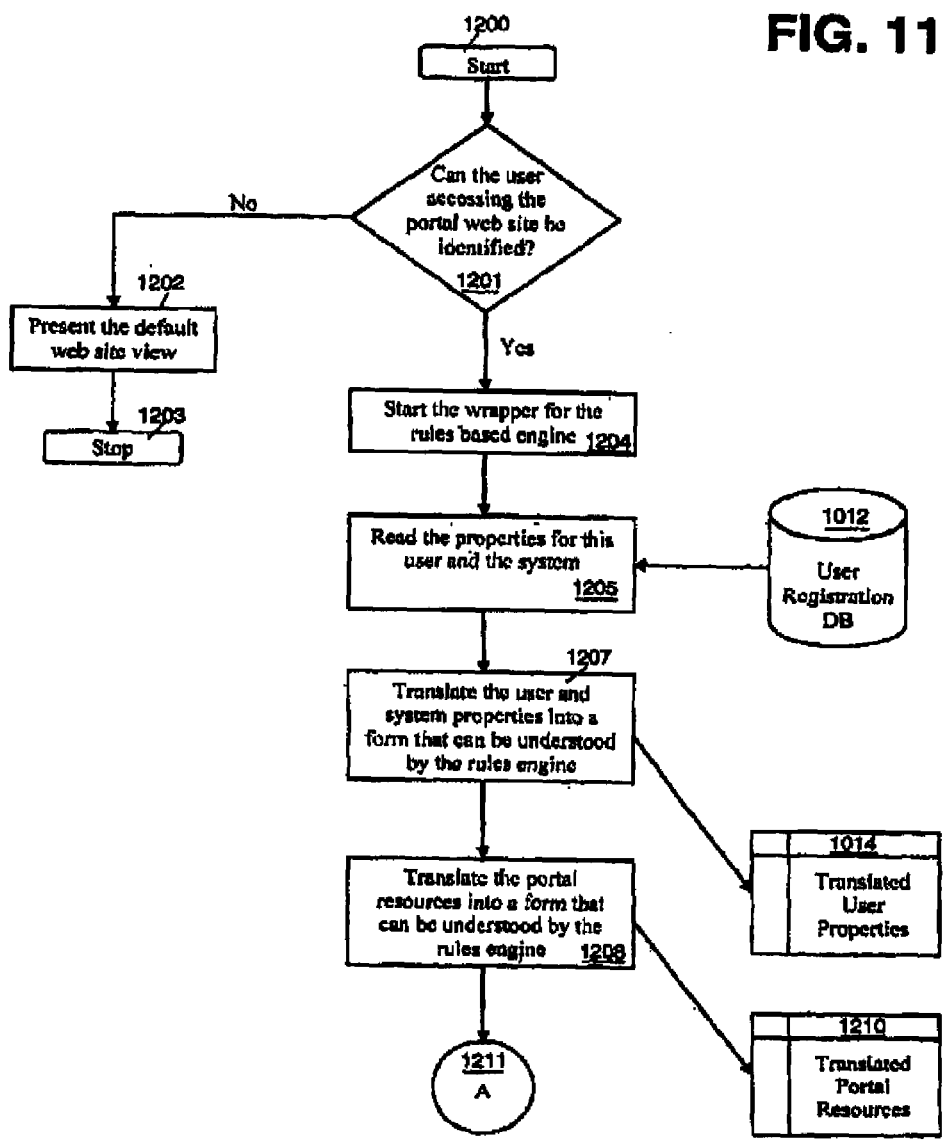
FIG. 11 depicts a Rule Based Dynamic Aggregation Component Flow Map.

FIG. 11 illustrates a rule based dynamic aggregation component structure map of a preferred embodiment of this invention. A description of the components of the illustrated embodiment and their operation follow:

Portal Resource Translation Module
  The portal resource translation module 1015 is responsible for translating the set of Portal resources including: portlets, pages and page groups into a form that can be parsed and processed by the external rules engine 1022.

Rules Database
  The rules database 1001 holds business manager defined rules for the portal aggregation engine 1006.

User Resource Translation Module
  The user resource translation module 1013 is responsible for translating user resources and the various user properties into a form that can be parsed and worked upon by the external rules engine.

Pluggable Rules Engine
  The rules engine 1022 is an external, pluggable rules engine (in this embodiment of the invention), such as the websphere™ personalization engine, that is used for dynamic rule parsing and execution. The engine's execution produces the set of portal resources that the user should see based on the business rules defined by the business user and the user properties of the current user.

Portal Roles Based Personalization Engine
  The Portal roles based personalization engine 1008 is a roles based resource selection module that is used for extracting the list of portal resources a user is allowed to access and the list of portal resources the user is not allowed to access based on the user's organization membership.

The roles based engine 1008 first looks at the user's organization by accessing the roles database 1007. Once the user's organization has been determined, his role is assumed to BE the same as the role of that organization. After this the roles based personalization engine 1008 extracts the list of resources that have been defined as accessible and inaccessible for this organization by the business user. Once this list has been determined IT is forwarded by this module to the portal aggregation engine's aggregated resource translation subsystem for further processing.

Roles DB

The Roles DB 1007 holds the organization data for the portal server. It holds information about organization membership for various users and also the list of portal resources that members of an organization can and can not access based on their roles.

Portal Aggregation Engine Aggregated Resource Translation Subsystem

This module 1004 is responsible for creating the master list of portal resources that the current user is allowed to see (this includes portlets, pages, and page groups) based on the output of the rules and roles based personalization engines. This module is also an adapter for the actual portal aggregation engine. Its job is to not only create this master list but also to translate it into a form that can then be accessed by the actual portal aggregation engine for creating the final web site for the end user.

Part B: Operational Description

B.1 Portal and Web Application Integration Enabling Description

B.1.1 Overall Integration Structure & Flow Diagrams

Figure 3:
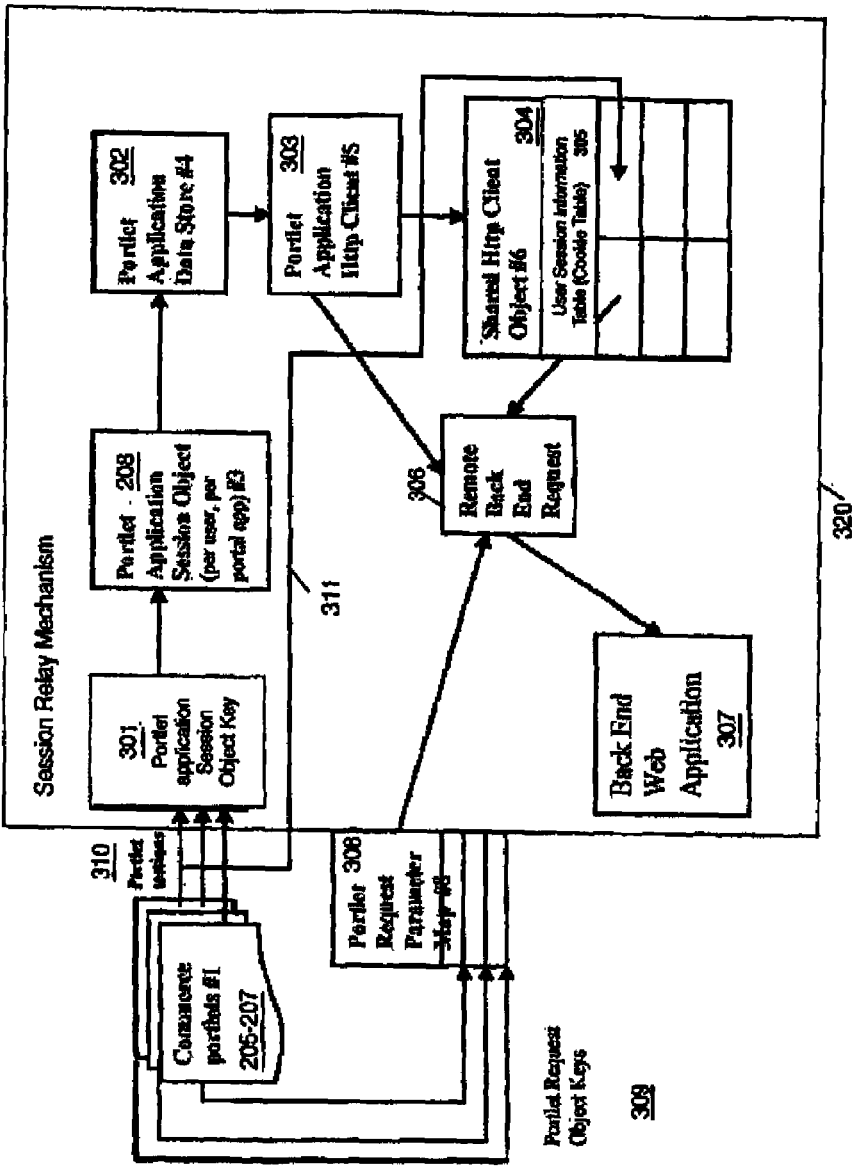
FIG. 3 depicts an Integration Structural Diagram.
Figure 4:
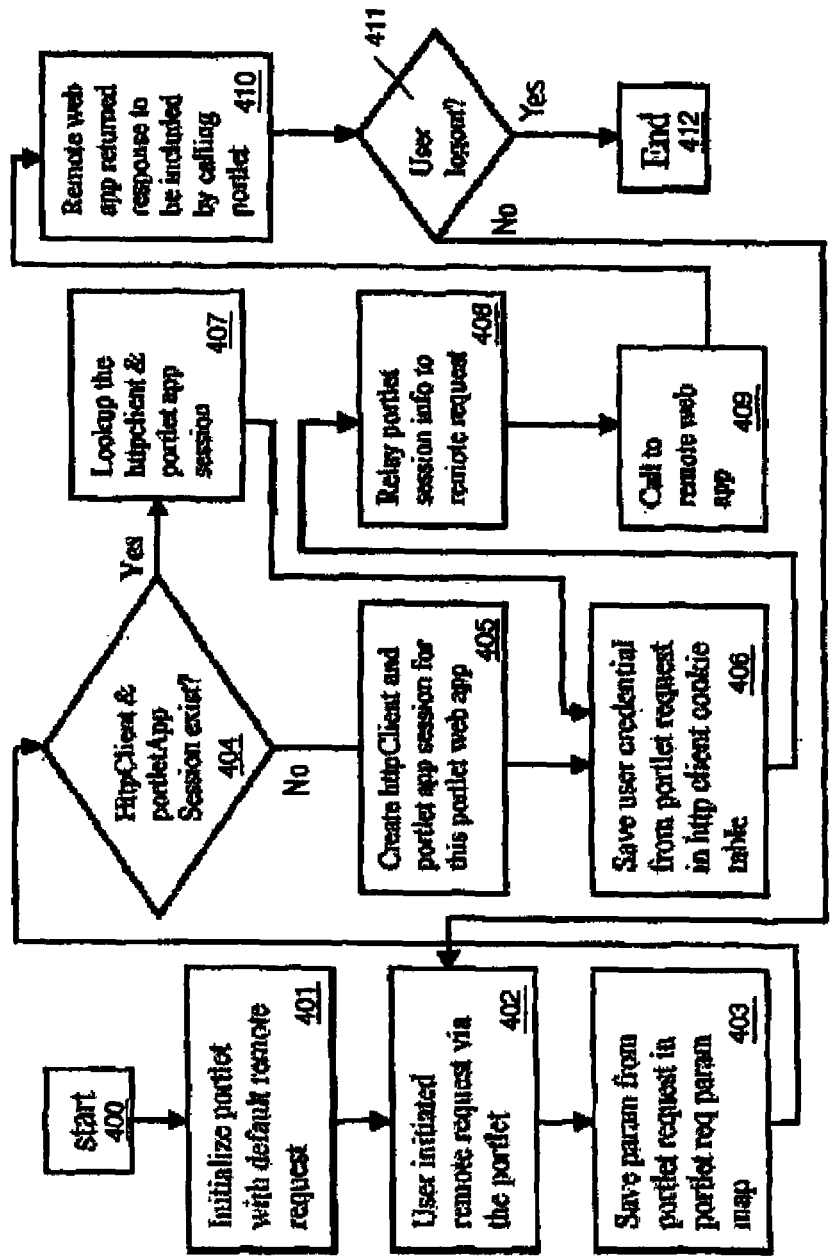
FIG. 4 depicts an Integration Flow Diagram.

FIGS. 2, 3, and 4, depict respectively: web application integration with a portal; an integration structural diagram; and an integration flow diagram.

B.1.2 Detailed Description

Referring to FIG. 2, when a backend web application is integrated with portal server, the backend web application 221 receives requests from the portal server 201 via portlets. The backend web application 221 sends responses back to the portlet making the request.

The response from the web application 221 is rendered via portlets of the portal server 201 to a user accessing the portlet.

With the implementation of the Portal Application HTTP client 209 multiple requests and responses to the backend web application are perceived by the back end web application as cohesive sessions. The Portal Application Http client 209 is used to open Http communication connections to the backend web application 221. The backend web application requires the Portal Application Http client 209 to provide session support, cookie handling and Single Sign On (SSO) capabilities. With the Portal Application HTTP client 209 in place, the portlets can effectively communicate with web application. All the portlets in a portlet application (such as portlet application 205) need to have access to one portlet application session object 211 of the back-end application 221, that means that Portal Application Http client 209 must be shared by all the portlets within the same portal application.

To make such sharing possible we have determined that a unified session object that can be shared by all portlets in a given portal application is needed. To provide such an object the invention herein provides a Portlet Application Session object 208. The Portlet Application session object 208 is an object that is created by the commerce portlet application. The portlet application session object 208 is accessible by all portlets in a given portlet application (such as portlets 204, 205, 206 in portlet application 1, 207). Without the portlet application session object, 208, multiple portlets in a given portal application will all have independent user sessions and will not be able to share session related information.

The Portlet Application Http client 209 is stored in the Portlet Application Session 208, making it possible to share it among portlets in the same portlet application. Without this portlet application session object it would not be possible for the portlets to communicate with a single web application session on the backend.

All the data that is stored in the Portal Application Session object 208 represents Portal Application Session context and exists per user per portal application.

Since the Portlet Application http client 209 holds all session information for the back-end web application 221, it is used as a base for the Session Relay mechanism 320 depicted in FIG. 3.

Session relaying allows session information to be relayed that is specific to the whole portal server 201 (such as language information, user agent information, etc) to the session information of the back-end web application 221. That means that the back-end web application 221 is able to deliver the data representation that conforms to all the requirements contained in the original request sent to the portal server by a user.

For example, if the user accesses the portal using a WAP (wireless application protocol) enabled mobile device, with default language locale set to "French" then The original http request to the portal server 201 will have ITS language parameter set to "French" and user-agent field of the HTTP header set to "WAP". The Session Relay mechanism 320 relays this information to the web-application 221 and the web application returns a response in French that is suitable for display on the user's mobile device in French. If the Session Relaying were absent the web-application would return the information in the default-language (for example English) suited for the default device (for example an Internet Browser). In that case the user would not be able to see the retrieved data as it would be incompatible with the user's mobile device.

Reference will be made to elements in the structural diagram FIG. 3 while process steps of FIG. 4 will be indicated by enumerated steps.

Step 401, the user interacts with portlets on a web portal, for instance by using a computer mouse to click on a link or object displayed in a portlet on the user's web browser. Each portlet has its own portlet session 310 (portlet session is a piece of prior art). As part of the user interaction, a remote request 306 is being made to be backend web application 307.

2. Step 403, in order to pass all the parameters in the portlet session correctly to the backend web application each portlet request's parameter list is saved in the Portlet Request Parameter Map (#8) 308. These parameters are passed to the remote back end request.

3. Step 404, the commerce portlet uses a http client key 301 to determine if there is already an existing Portlet Application Session Object 208 and Portlet Application Http Client 303 by accessing portlet application data store #4, 302. step 405, If one is not found, a new one will be created for all the portlets within the same portlet application. (Step 407, If one is found, the existing one will be used instead.)

4. Step 406, each user credential from the original portlet session is saved in the cookie table 305.

5. Step 408, the user credentials from the cookie table 305 and the parameters previously saved in the portlet request parameter map 308 are used to construct a new http request to the backend web application.

6. Step 409, the call to remote web application is made 307.

7. Step 410, the remote web application 307 returns a response to the call for the portlet to display.

B.2 Dynamic Context Synchronization of Portlets

B.2.1 Development Time Description

Referring to FIG. 5 which depicts a structural diagram of portal integration with a backend web application, it may be seen that a portal developer can make use of the Dynamic Context Portlet Grouping Tool 501 to create each new Dynamic Group Definition Instance 504. This instance is a grouping of associate portlets and defines which portlets are slaves and which portlet is the master of those slaves. The required elements of the Dynamic Group Definition ARE specified in the Dynamic Context Group Definition Template 503.

User uses the same tool 501 to update an existing Dynamic Context Group Definition.

After the user has provided the latest dynamic context group definition, the Dynamic Context Portlet Grouping Tool 501 updates the appropriate portlet application deployment descriptors 502 to reflect the relationships defined in the group.

Figure 6:
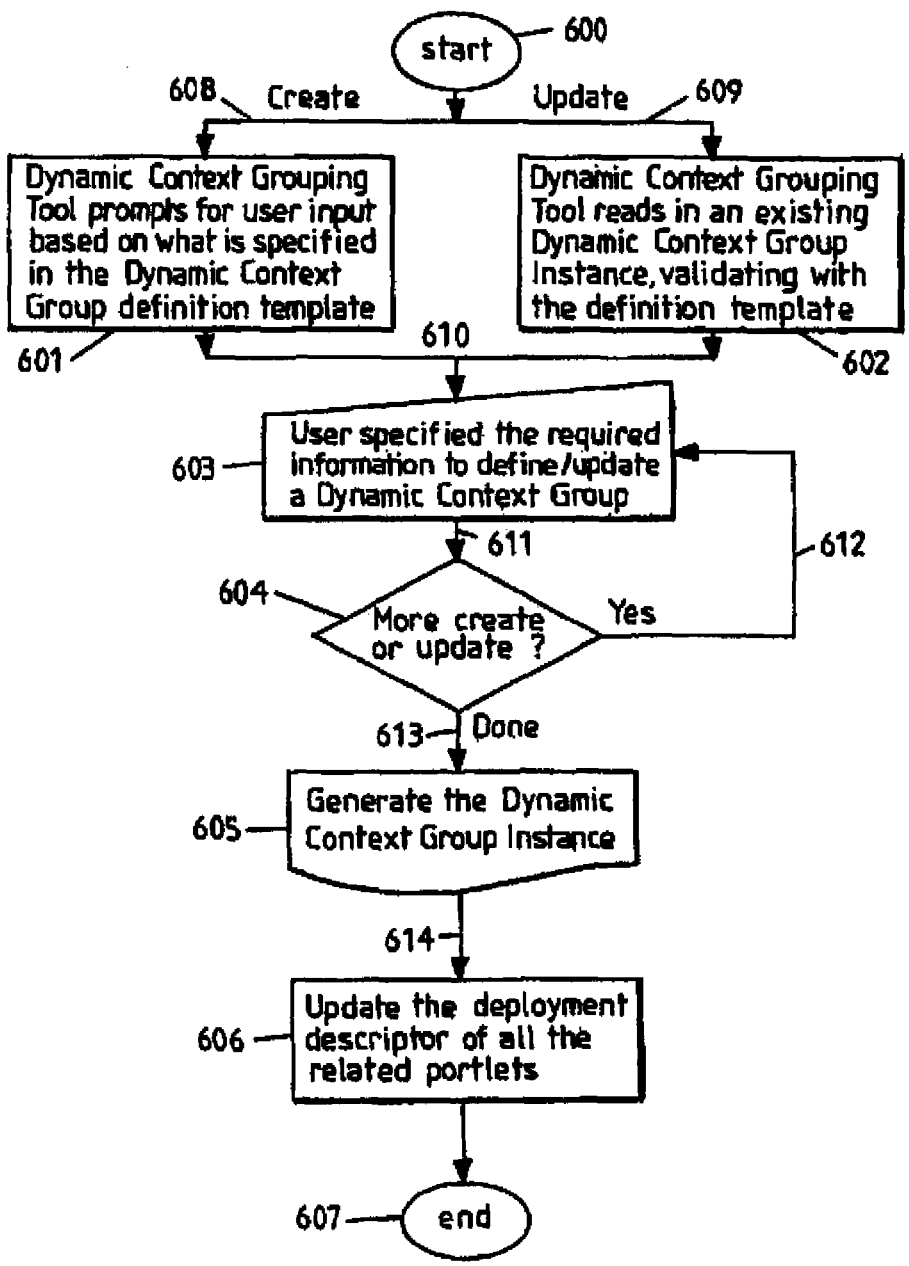
FIG. 6 depicts a Flow Chart for Integration.

Referring to FIG. 6, a flow chart representing portal integration the steps of the above process may be more clearly visualized:

When a user wants to create (608) or update (609) a dynamic context group, the user can employ the grouping tool 501 (FIG. 5).

601, the dynamic context grouping tool prompts for user input based on what is specified in the dynamic context group definition template 503, or in the case of updating the dynamic context grouping tool reads in an existing dynamic context group instance, validating it with the definition template 503.

603, the user specifies the required information to define or update a dynamic context group.

605, the dynamic context group instance 504 is generated.

606, the deployment descriptor of all related portlets are updated.

Dynamic Context Grouping

Figure 7:
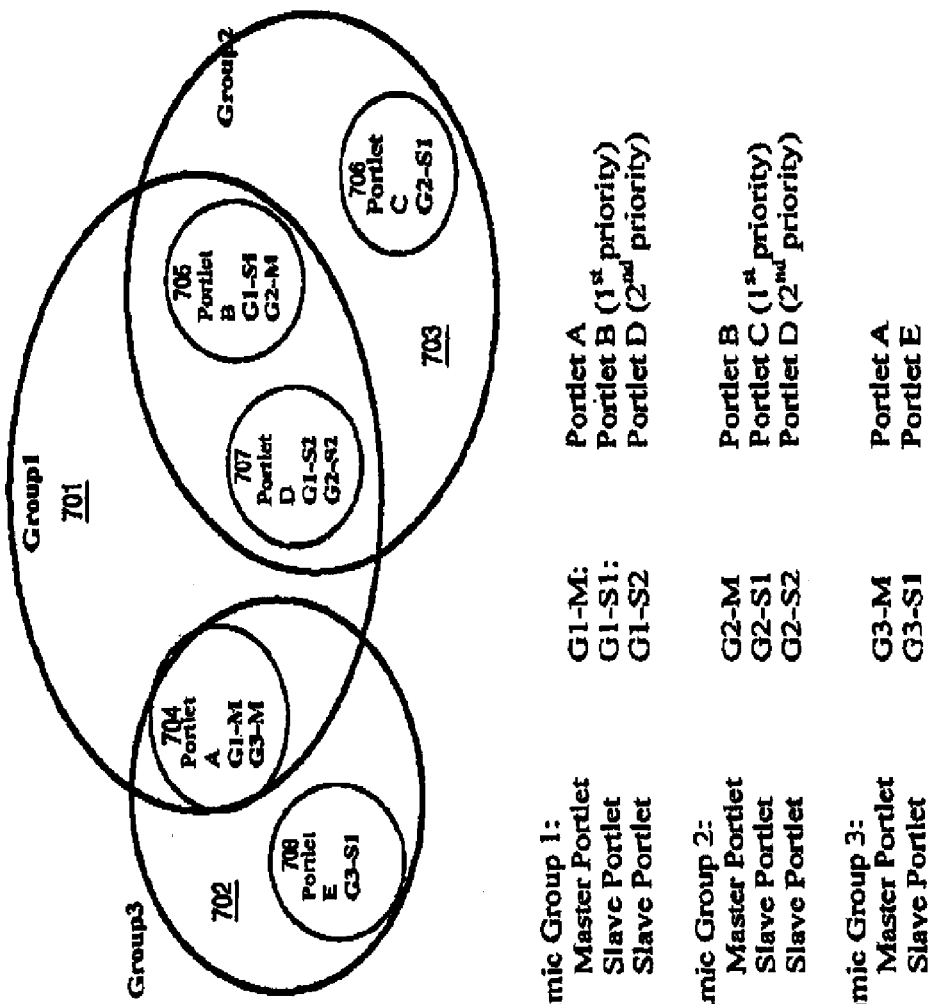
FIG. 7 depicts an Example Of Dynamic Context Groups for Portlets.

FIG. 7 illustrates dynamic context for portlets. Dynamic group 701 is comprised of master portlet 704, slave portlet 705, and slave portlet 707.

Group 703 is comprised of master portlet 705, slave portlet 706, and slave portlet 707.

Dynamic group 702 is comprised of master portlet 704 and slave portlet 708.

If the data that is represented by portlets in a Portlet Application is synchronized at the back-end application level, then the portlets deliver a coordinated view of the data just by retrieving that data from the web application. However, not all portlet interactions result in the changes at the backend web application. Dynamic context serves as the synchronization 'at the glass'. It is most effective when a change in context requires a different query. For example, selecting a different account from the account list requires displaying of invoice information being refreshed with the account selected.

In prior art systems Portlets were normally independent of each another. This invention provides a method to map the relations of portlets with each other and articulate their dependency on each other at portlet application deployment and configuration time. The portlets themselves do not need to be changed.

The dependency relationships among portlets can be defined in a Dynamic Context Relationship Template 503 in which the master and slave relationships are defined.

The Dynamic Context Relationship Template 503 is preferably encoded as an XML data representation that defines the following:

the subset of portlets that constitute a dynamic context group the master portlet of a dynamic context group the slave(s) portlet of this dynamic context group the slave action that the slave(s) have to perform upon context state changes the context that all constituents of this dynamic context group share An example of a Dynamic Context Group definition instance follows:

```
<DynamicContextGroup>
    <DynamicContextGroupName>OrderRelatedPortletGroup
    </DynamicContextGroupName>
    <DynamicContextMasterPortlet>
        OrderItems
    </DynamicContextMasterPortlet>
    <DynamicContext>itemName
    </DynamicContext>
    <DynamicContextSlavePortlet>
        <DynamicContextSlavePortletName>UPSTracking
        </DynamicContextSlavePortletName>
        <SlavePortletAction>
            http://inventoryserver.com/inStock/
        </SlavePortletAction>
    </DynamicContextSlavePortlet>
</DynamicContextGroup>
<DynamicContextGroup>
    <DynamicContextGroupName>StockInventoryPortletGroup
    </DynamicContextGroupName>
    <DynamicContextMasterPortlet>
        InStockInventory
    </DynamicContextMasterPortlet>
    <DynamicContext>itemSKUnumber
    </DynamicContext>
    <DynamicContextSlavePortlet>
        <DynamicContextSlavePortletName>OrderedItems
        </DynamicContextSlavePortletName>
        <SlavePortletAction>
            http://myserver.com/lastOrdered/
        </SlavePortletAction>
    </DynamicContextSlavePortlet>
</DynamicContextGroup>
```

The dynamic context group Definition Instances note: one dynamic context group definition is one instance. However, multiple dynamic context group definitions can be consolidated into one file to define multiple instances above defines two portlet sets in a portlet application consisting of 3 portlets.

In the first dynamic context group, the dynamic context shared between the portlets is itemName, the portlet named OrderedItems serves as Dynamic context Master portlet and portlets UPSTracking and InStockInventory serve as the Dynamic context Slave portlets.

In the second dynamic context group, the dynamic context shared between the portlets is itemSkuNumber, the portlet named InStockInventory serves as Dynamic context Master portlet and portlet OrderedItems and serves as the Dynamic context Slave portlets.

Each Dynamic context Master portlet observes a user HTTP request and looks for the dynamic context. If the dynamic context is found in the request, the dynamic context portlet sends a dynamic context (which is the name and value pair parameter in the http request) to the Slave portlets.

For example if OrderedItems portlet receives an HTTP request with attribute itemName set to "PentiumIV" it sends the dynamic context to the portlets UPSTracking and InStockInventory notifying them that context itemName with value "PentiumIV" was now set in the dynamic context.

Each Dynamic context Slave portlet listens to the master's notification to all slave portlets of the same dynamic context group. Upon receiving the master's notification, the corresponding slave action is invoked by adding the dynamic context to the action URL as defined in the dynamic context group definition instance under attribute 'SlavePortletAction'.

For example if inStockInventory portlet receives the dynamic context from OrderItems portlet with dynamic context type "itemName" and value "PentiumIV" it will retrieve the data from the http://inventoryserver.com/inStock/itemName=PentiumIV URL.

Coding for an example of a Dynamic Context Group Definition Template follows:

```
<xsd:schema
    xmlns:xsd="http://www.w3.org/2001/XMLSchema"
    xmlns:cep=
"http://www.ibm.com/WebsphereCommerceEnabledPortal/
DynamicContextGroupDefinitionSchema">
        <annotation>
        <documentation xml:lang="en">
            Schema for Websphere Commerce Enabled Portal
Dynamic Context Group Definition
            Copyright 2002 IBM Corporation
        <documentation>
        </annotation>
        <!-Dynamic Context Group Instance -->
        <xsd:element name="DynamicContextGroup"
            type="DynamicContextGroupDefinitionTemplate",
            minOccurs="1"/>
<!-Dynamic Context Group Definition Template Schema __
<xsd:complexType name="DynamicContextGroupDefinitionTemplate">
        <xsd:sequence>
    <xsd:element name="DynamicContextGroupName"
type="xsd:string"/>
        <xsd:element name="DynamicContextMasterPortlet"
type="PortletName"/>
        <!- only one dynamic context per dynamic context group ->
        <xsd:element name="DynamicContext" type="ContextParameter"
maxOccurs="1"/>
        <xsd:element name="DynamicContextSlavePortlet"
type="SlavePortlet"
                                            minOccurs="1"/>
        </xsd:sequence>
</xsd:complexType>
        <xsd:complexType name="SlavePortlet">
            <xsd:sequence>
        <xsd:element name="DynamicContextSlavePortlet"
type="PortletName"/>
        <xsd:element name="SlavePortletAction" type="xsd:string"/>
        <xsd:element name="SlavePortletRefeshPriority"
type="xsd:decimal",
                                            minOccurs="0"/>
        <!- master's context is in the slave action url if slave param
map is absent -->
        <xsd:element name="SlaveParamMapToContext"
type="ContextParameter"
                                            minOccurs="0"/>
        </xsd:sequence>
    </xsd:complexType>
        <xsd:simpleType name="PortletName">
    <xsd:string>
        </xsd:simpleType>
    <!- name of the parameter in master's request url -->
        <xsd:simpleType name="ContextParameter">
    <xsd:string>
        </xsd:simpleType>
</xsd:schema>
```

B.2.2 Run Time

This section will best understood by referring to FIG. 8: Portlet Application Initialization For Dynamic Context As Specified In The Definition Instance; and FIG. 9: Dynamic Context Portlet Group Run Time Flow.

There are two key component to handle Runtime aspects of the Dynamic Context:

1) DynamicContextActionListener (904) (Portlet Action Listener)—it listens for the dynamic context change in the Master portlet. Master portlet in every Dynamic Context Portlet Group has DynamicContextActionListener attached to it.

2) DynamicContextMessageListener (906) (Portlet Message Listener)—is the Message Listener listens for the notification from the Master of the group where specific Dynamic Context is defined. Every Slave portlet in the Dynamic Context Portlets Group has a DynamicContextMessageListener attached to it.

Step-by-step Description of the Run-time Flow:

At portlet initialization time (FIG. 8: 801), all master portlets will add the defined dynamic context based on the portlet descriptor (802, 805) to the master portlet's action listener (806). For all slave portlets; the dynamic context type; the action url; the parameter mapping and the refresh sequence, will be retrieved from the portlet descriptor (802, 809) and add to the slave's portlet message listener (810).

1) The user interaction with the Dynamic Context Portlet Group Master portlet results in the change of the Dynamic Context (901).
2) Master's Portlet DynamicContextActionListener detects the user's action (902).
3) DynamicContextActionListener sets the name/value pair corresponding to the Dynamic Context in the requests object of the Master Portlet (904).
4) Master Portlet gets the value of the Dynamic Context and notifies all the slave portlets within the same dynamic portlet group about it (905).
5) DynamicContextMessageListener associated with the Slave portlet for the given Master receives the notification (the value of the dynamic context) (906).
6) DynamicContextMessageListener sets the value of the DynamicContext in the portlet request object of the Slave portlet. (907).
7) The Slave portlet gets the value of the dynamic context (1008).
8) The Slave Portlet modifies action defined for the given Slave Portlet if the mapping between context and some parameter was specified (1009).
9) If the mapping was not specified, the name/value pair of the dynamic context is added to the Slave's Portlet action.
10) Slave Portlet performs the Action as defined in the dynamic context group instance definition (1011, 1012).

B.3 Rule Based Role Based Dynamic Aggregation

Figure 12A:
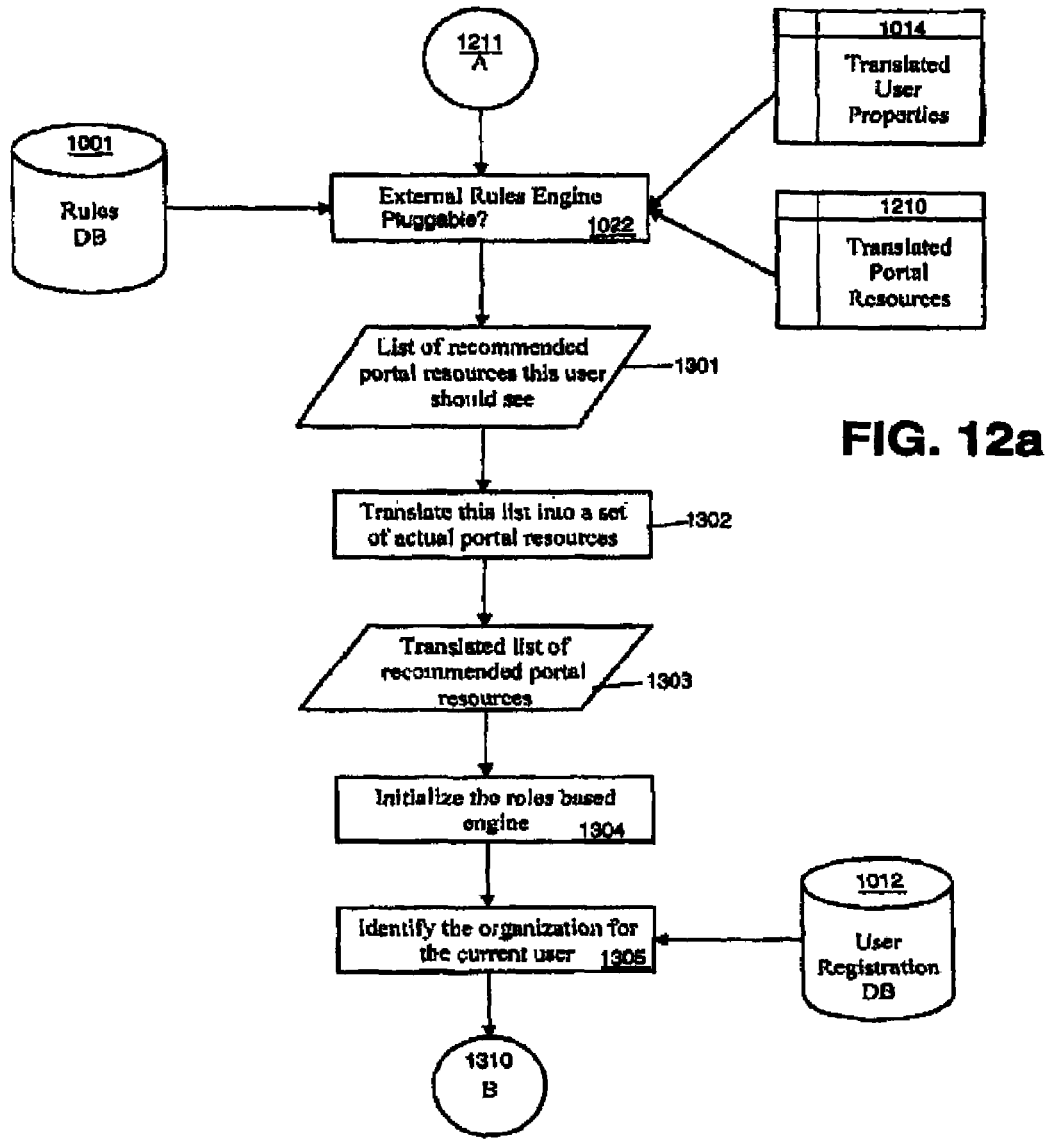
FIG. 12 depicts a Role Based Dynamic Aggregation Flow Chart.

A number of figures will be referred to in this section including: FIG. 10: Role Based Dynamic Aggregation Component Structure Map; FIG. 11: Rule Based Dynamic Aggregation Component Structure Map; and, FIG. 12: Rule Based Dynamic Aggregation Flow Chart.

The role and rules based dynamic aggregation components for the portlet server are based around the rules and roles databases and the concept of content groups for each role and rule.

The content groups for the rules are kept in the Rules DB component 1001 shown in FIG. 10. Similarly the roles content groups are defined in the Roles DB component 1007 shown in FIG. 10. Each content group consists of a set of portal server resources that a user who has been evaluated to fall under the purview of that particular role or rule should have access to.

Another major component in this scheme is the Pluggable Rules Engine 1022. The task of this engine is to read in the translated user properties and decide dynamically at runtime the set of users who qualify for membership of a certain predefined user group based on these user properties. Also this engine maps the set of these dynamic user groups to the set of content groups that have been defined in the roles and rules DB. Preferably the Pluggable Rules Engine has a GUI to manage these tasks. The screen shot depicted in FIG. 16 illustrates how we use the WebSphere Personalization Server Engine to manage these tasks.

Figure 16:
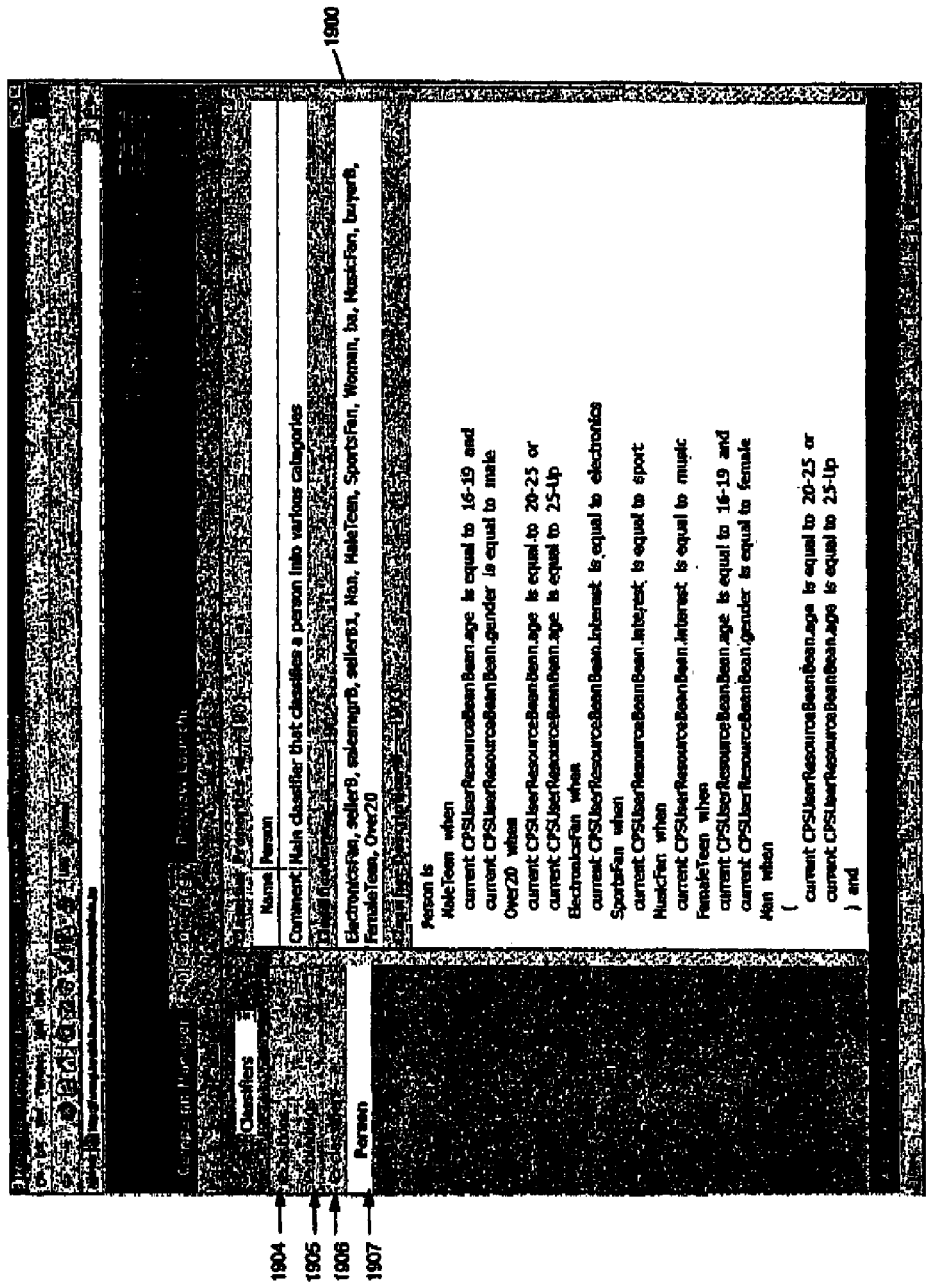
FIG. 16 depicts the defining of a dynamic group called "MaleTeen" and assigning users to the group.

For example, FIG. 16 illustrates how we define a dynamic group called "MaleTeen" and assigns all male users of ages between 16-19 to this group.

Figure 17:
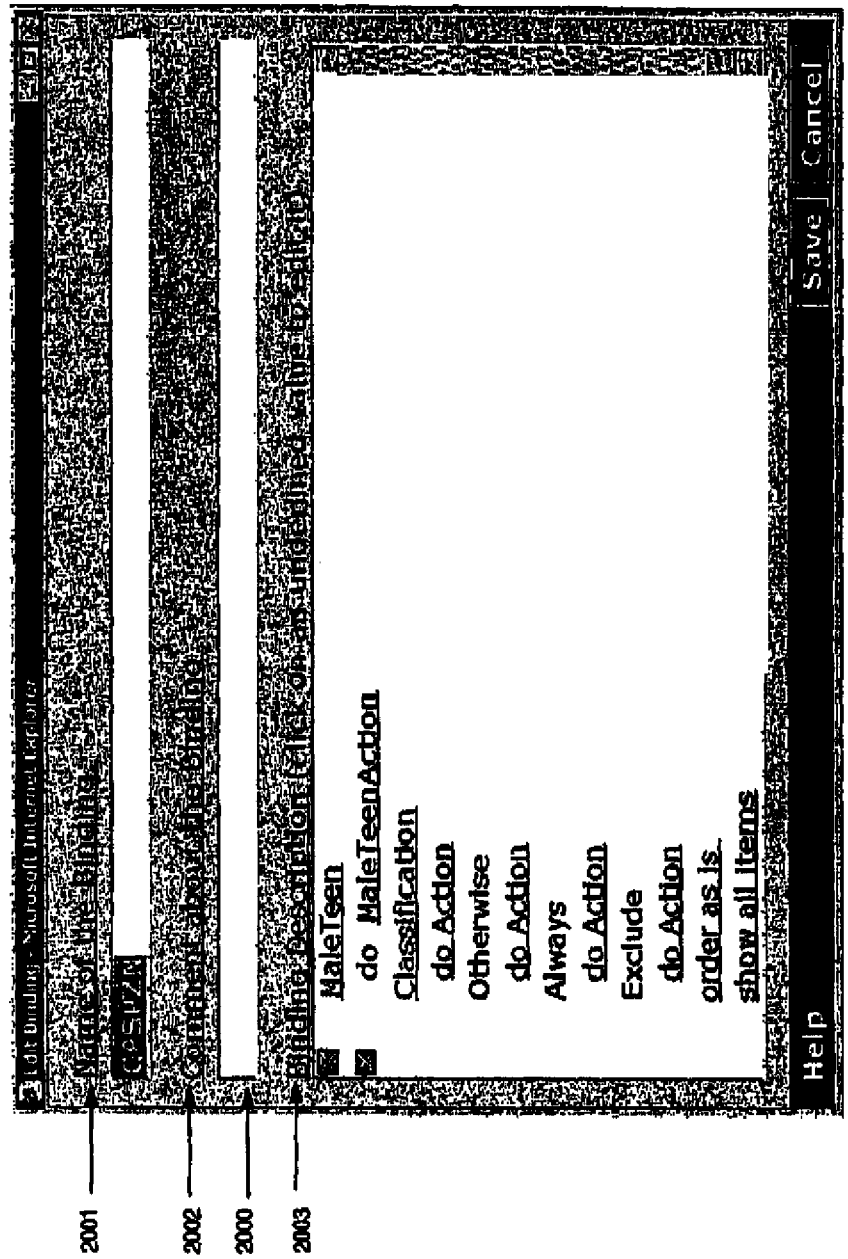
FIG. 17 depicts the assigning a rules database content group selection action to a dynamic user group; and, FIG. 18 depicts the creation of a new action called "male-TeenAction".

As shown in FIG. 17, which depicts all users who are dynamically evaluated to be male teenagers based on their properties will now have the "maleteenaction" command executed for them which would instruct the dynamic rules and roles based portal aggregation engine 1022 to select content resource for the male teen group from the Roles DB 1007.

At development time it is the task of a business manager to assign a set of portal resources such as: pages, portlets etc. to a specific content group in the Roles and Rules DB. This is currently done by using SQL scripts that directly load the Rules and Roles DB.

B.3.1 Rule Based Role Based Dynamic Aggregation Run Time Enabling Description

At runtime the first command to execute for a portal user is the wrapper command for the rules based engine. This command is actually a proxy that starts the evaluation of user's properties by the actual pluggable rules engine.

In the next step the rules engine reads in the user's properties from his stored profile, by utilizing the user resource translation module to translate them into a form that can be understood by it.

Figure 18:
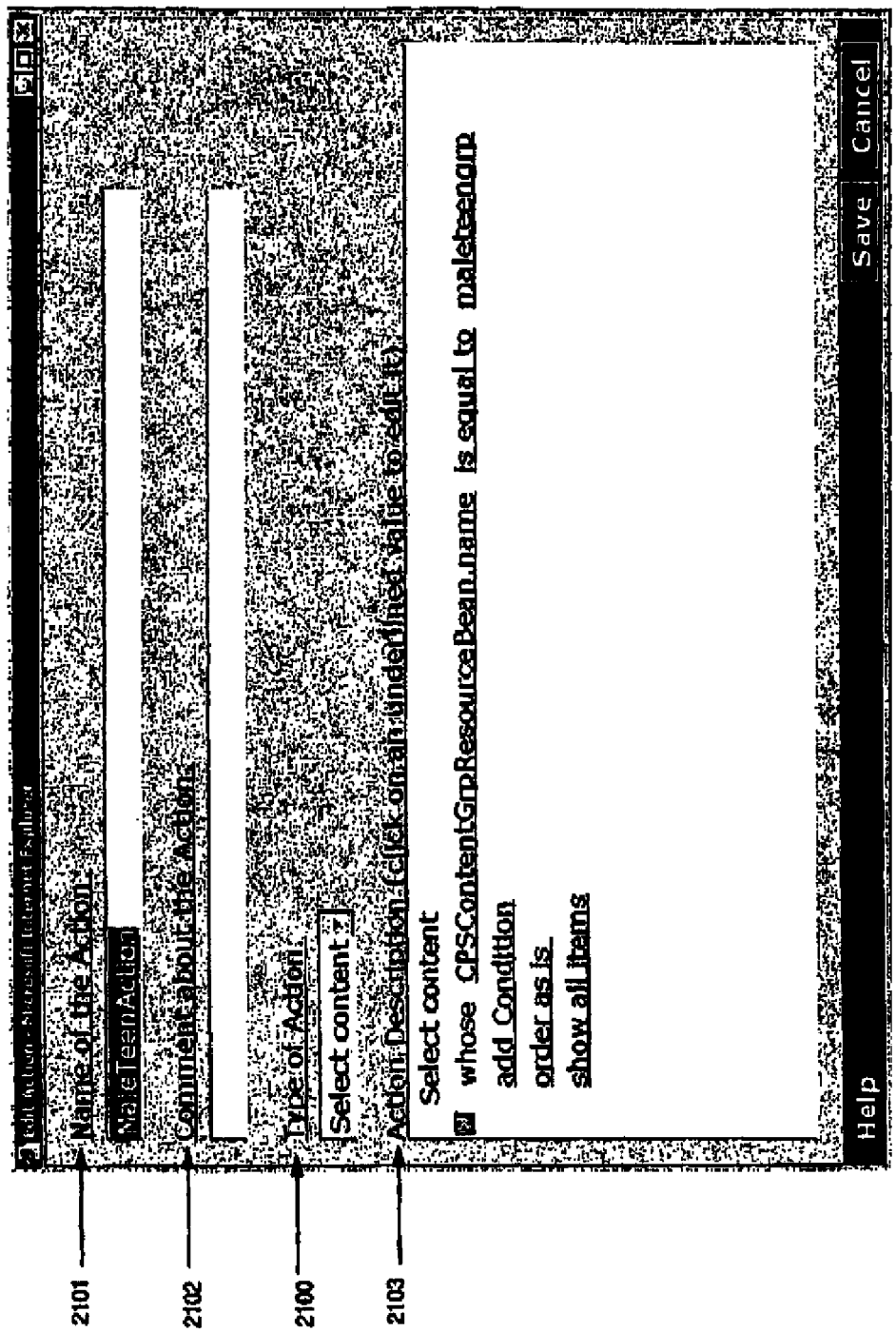

FIG. 18 illustrates the creation of a new action called "MaleTeenAction" which selects all the portal resources that have been defined in the content group called "maleteengrp" in the rules DB.

FIG. 17 illustrates creation of a dynamic aggregation module command instructing the aggregation module to select the contents of the "maleteengrp" for all the users who fall under the purview of the previously created rule for classifying "MaleTeens" based on dynamic user properties.

FIG. 17 illustrates how a given business rule (e.g. business rule in defining what constitutes a maleteen group) takes effect (e.g. maleTeenAction) in determining what content to aggregate for a given user, with a certain user properties, falls under such classification.

After reading in the user properties the pluggable rules engine evaluates the dynamic group membership of this user based on the rules defined for the various dynamic groups as shown in FIG. 18.

Once the set of dynamic groups for this user has been ascertained the rules engine selects the appropriate portal content for this user by executing the content selection actions defined for this dynamic group as shown in FIG. 18. These actions upon execution return the set of portal resources from the content groups defined for them in the Rules DB.

The next execution step is the evaluation of the roles assigned to this user by the roles engine. The roles engine uses the organization membership (extracted from the user profile properties) to extract the set of content resources for this user's role from the Roles DB. These resources are then added to the already existing list of rules based portal resources created in the previous set.

This list is then forwarded to the dynamic Portal Aggregation Engine for execution. The dynamic portal aggregation engine then selects the portal resources identified by this list to set up the default portal view for this current user.

SUMMARY

1. Common Backend Web Application Integration Implementation

With the Portlet Application Http Client and Portlet Application Session, it is now possible to have a common backend web application integration model. This can be used to enable multiple portlets within the same portlet application to communicate with the same web application backend.

This implementation makes it possible to:

i. have native portlet integration without launching separate browsers, and without requiring multiple prompts for user id and password to access the same backend web application;

ii. make multiple requests and receive responses to/from the backend application with session management.

2. Simple Common System Leading to Simple Tooling

The instant implementation, provides an easy and quick method to integrate portlet applications with an existing web application operating on a backend server; with merely requiring the specification of the url of the pertinent backend web application in the deployment descriptor of the portlet application. With this, it becomes possible to build tooling to take care of the commonality tasks of the integration.

3. Portlets Within the Portlet Application Share Common Session and Session Data The implementation of a portlet application session object makes it possible for portlets of the same portlet application to share common data among themselves that are unique within a portlet application, while at the same time being different from that of the original http session of the portal server. This facilitates the sharing of data unique among the portlets within the same portlet application.

4. Portal Session and Back End Session Sharing Common Session Data

The session relay implementation makes possible the sharing of common session data between a portal server and its backend web application. This enables the backend web application to receive information from the portal server, enabling business logic of the web application to exploit this information passed from the portal server.

For example: if the current portlet state is to display the maximized view of the portlet, the backend web application can receive this piece of information and take advantage of this by sending back detailed business information, in contrast to the normal view of a portlet, in which case the backend web application would just send a summary version of the information.

5. Cohesive Back End Web Application Session Distinct from the Portal Server

With the portlet application session, portlet application session object, portlet http client, and the session relay mechanism A back end web application can now preserve its own session distinct from that of the portal server, but still share the same cookie with that of the portal server. The backend web application can now operate independently and correctly, perceiving portlet requests from various portlets in a portal as one virtual client, enabling a cohesive session with the backend web application.

6. Single Sign On Across Portal Server and Back End Web Application

The session relay embodiment provides single sign-on capability such that the user, once logged on to a portal server, is not required to resubmit user credentials to log on to the pertinent back end web application. This is enabled by means of a cookie table with one to one mapping between the http session to the portal and the http session from the portlet http client to the backend web application.

7. Back End Web Application Behavior Synchronized with That of the Portal Server The session relay embodiment enables enabling seamless integration by synchronizing the behavior of a backend web application by relaying the session information from the portal session to the session of the back end web application.

The following are some examples:

The language and locale setting in a portal server can now be passed to its backend web application so that the backend application can now compose a response message based on the locale+language setting of the portal server.

Another example is that session expiry information from the portal server can now be passed to the backend web application session so that the backend web application session can now be timed out at the same time that the portal session times out. The backend web application can now be responsive to the portal state and events as relayed from the portal server.

8. Synchronized Content Within the Same Portal Page

Dynamic Context Portlet Grouping allows collaboration among portlets within the same dynamic context group to achieve business process and information integration and synchronization.

Each portlet is allowed to participate in multiple Dynamic Context Groups. This provides a very open and simple programming model for portal administrator to group portlets into dynamic context portlet groups.

The simple structure of Dynamic Context definition enables simple tooling to be built for automatic generation of Dynamic Context Master and Slave portlets for each grouping.

Dynamic Context Definition implementation, Dynamic Context Group, master portlet and slave portlet implementation (including the slave tasks, slave context map) assist in providing advantages.

9. Ability to Define Refresh Sequence of Portlets

The transaction manager provides the capability of defining a refresh sequence of portlets for the first time. The ability to define refresh sequence of portlets enables proper implementation of sequential business logic using the portal/portlet architecture. The transaction manager; resource sorter; the caching of responses assist in providing advantages of the invention.

10. Rule Based and Role Based Aggregation

Fine level portal personalization can only be achieved at present by dynamic aggregation. This is distinctly different from the prior art implementation of regular web applications in which there is no formal concept of portlets, pages or page groups. Fine level personalization will become more and more important as the portal market takes off and user requirements for fine level campaign targeting etc. come in.

The described embodiments provide a number of advantages which are listed below:

1. The level of personalization that can be achieved by our approach is much finer grained than. Portlet administration facilities provided by portal server today. The portlet administration facilities available today is by nature manual configuration. Once configured, it is static and does not change at run time. The invention here provides a dynamic capabilities to render portal resources based on rule.
2. Since the portal aggregation module is a dynamic entity, tying of rules and roles engines directly to it lets us achieve real-time dynamic aggregation capabilities without any human intervention.
3. Personalization of coarse grained portal resources such as pages and page groups lets us perform dynamic layout.
4. Much more effective campaigns, contracts etc. can be set up. This is of significant importance to both e-Commerce retail and B2B organizations.
5. A much higher degree of personalization than regular content personalization is achieved. For example, entire sections of a webpage can be disabled based on rules. This can't be done by regular personalization. Further, dynamic aggregation doesn't apply to the domain of regular personalization which is content, not resource related.

The invention claimed is:

1. A method of collaboration between a plurality of associated portlets in a portal server comprising:
   defining a common Portlet Application Session Object, the Portlet Application Session Object comprising a data store session object and configured to allow each portlet in a portlet application to share session information;
   associating each portlet in a portlet application with a portlet descriptor describing a dynamic context name, each portlet configured to access the common Portlet Application Session Object, the dynamic context name referencing a dynamic context configured to be changed during runtime; and
   forming collaboration groups of portlets having corresponding dynamic context names, a collaboration group being a subgroup of the group of portlets in the portlet application, the portlets in each collaboration group sharing dynamic context changes through the Portlet Application Session Object.

2. The method of claim 1 wherein said context names define dynamic context values; each said group of portlets including a master portlet and at least one slave portlet.

3. The method of claim 2 wherein each said group of portlets share dynamic context names in common.

4. The method of claim 3 including communicating changes in dynamic context values of a master portlet to slave portlets of said master portlet.

5. The method of claim 4 including changing dynamic context values of said slave portlets to match dynamic context values of said master portlet as communicated.

6. The method of claim 2 wherein each portlet belongs to a plurality of collaboration groups, each collaboration group comprising corresponding dynamic context names.

7. The method of claim 1 wherein each portlet in a portlet application comprises an independent portlet session, all independent portlet sessions for a portlet application sharing a Portlet Application Session Object.

* * * * *